United States Patent
Abedini et al.

(10) Patent No.: US 11,877,306 B2
(45) Date of Patent: Jan. 16, 2024

(54) INTERFERENCE MEASUREMENT CONFIGURATIONS IN WIRELESS SYSTEMS

(71) Applicant: QUALCOMM Incorporated, San Diego, CA (US)

(72) Inventors: Navid Abedini, Basking Ridge, NJ (US); Jianghong Luo, Skillman, NJ (US); Tao Luo, San Diego, CA (US); Luca Blessent, Whitehouse Station, NJ (US); Karl Georg Hampel, Hoboken, NJ (US); Junyi Li, Franklin Park, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 184 days.

(21) Appl. No.: 17/150,446

(22) Filed: Jan. 15, 2021

(65) Prior Publication Data
US 2021/0227552 A1    Jul. 22, 2021

Related U.S. Application Data

(60) Provisional application No. 62/964,353, filed on Jan. 22, 2020.

(51) Int. Cl.
*H04W 72/08*    (2009.01)
*H04W 24/10*    (2009.01)
(Continued)

(52) U.S. Cl.
CPC ......... *H04W 72/541* (2023.01); *H04B 7/024* (2013.01); *H04B 7/0617* (2013.01);
(Continued)

(58) Field of Classification Search
None
See application file for complete search history.

(56) References Cited

U.S. PATENT DOCUMENTS

2015/0117351 A1\* 4/2015 Nagata ............... H04L 25/0228
370/329
2018/0249461 A1\* 8/2018 Miao .................... H04W 24/02
(Continued)

FOREIGN PATENT DOCUMENTS

WO    WO-2018174305 A1    9/2018

OTHER PUBLICATIONS

"3rd Generation Partnership Project; Technical Specification Group Radio Access Network; NR; Study on Integrated Access and Backhaul; (Release 16)", 3GPP Draft, 38.874, V16.0.0, 3rd Generation Partnership Project (3GPP), Mobile Competence Centre, 650, Route Des Lucioles, F-06921, Sophia-Antipolis Cedex, France, Jan. 11, 2019 (Jan. 11, 2019), XP051576885, Dec. 2018, pp. 1-111, Retrieved from the Internet: URL: http://www.3gpp.org/ftp/tsg%5Fran/WG2%5FRL2/Specifications/201812%5Ffinal%5Fspecs%5Fafter%5FRAN%5F82/38874%2Dg00%2Ezip, [retrieved on Jan. 11, 2019] Section 9.7, Cited in the Application, Paragraph 6 .1.1 Abstract Section 6.2 IAB Architectures Proposed, p. 13-p. 17 Section 9.7 Topology Adaptation, p. 76-p. 86, 9.2 IAB Topologies, 9.3 Integration of IAB-node, 9.4 Modifications to CU/DU Architecture, 9.4.1 Modifications of IAB- donor/IAB-node, DU and IAB-Donor CU for Architecture Group, 1 72, p. 64-p. 72. Paragraph 7.3.1, paragraph 7.5.

(Continued)

*Primary Examiner* — Steve R Young
(74) *Attorney, Agent, or Firm* — Holland & Hart LLP

(57) ABSTRACT

Methods, systems, and devices for wireless communications are described. A wireless node may determine a configuration for interference measurement at the first wireless node, which may indicate a set of uplink resources for uplink reference signals and a beam sweeping configuration. Additionally, or alternatively, the configuration may indicate one or more resource sets configured for interference measure- (Continued)

ment. In some cases, the first wireless node may determine a set of transmission beams for the uplink reference signals based on the beam sweeping configuration, and the first wireless node may transmit the uplink reference signals via all of the transmission beams supported by the first wireless node.

27 Claims, 21 Drawing Sheets

(51) Int. Cl.
*H04W 72/04* (2023.01)
*H04L 5/00* (2006.01)
*H04B 7/06* (2006.01)
*H04B 7/024* (2017.01)
*H04W 72/541* (2023.01)
*H04W 72/21* (2023.01)

(52) U.S. Cl.
CPC ........... *H04L 5/0048* (2013.01); *H04W 24/10* (2013.01); *H04W 72/21* (2023.01)

(56) References Cited

U.S. PATENT DOCUMENTS

| | | | |
|---|---|---|---|
| 2019/0363810 A1 | 11/2019 | Luo et al. | |
| 2020/0028654 A1* | 1/2020 | Chen | H04L 1/0026 |
| 2020/0068549 A1* | 2/2020 | Kang | H04W 16/28 |
| 2020/0119821 A1* | 4/2020 | Qin | H04W 8/24 |
| 2020/0245166 A1* | 7/2020 | Kwak | H04B 7/024 |
| 2020/0322963 A1* | 10/2020 | Li | H04L 5/0048 |
| 2021/0084655 A1* | 3/2021 | Estevez | H04B 7/0408 |
| 2021/0111823 A1* | 4/2021 | Choi | H04B 7/0695 |
| 2021/0167877 A1* | 6/2021 | Choi | H04B 17/345 |
| 2021/0351825 A1* | 11/2021 | Zhang | H04L 5/005 |

OTHER PUBLICATIONS

Interdigital, et al., "On DL and UL Beam Management", 3GPP Draft, 3GPP TSG RAN WG1 Meeting NR#3, R1-1716468, On DL and UL Beam Management Final, 3rd Generation Partnership Project (3GPP), Mobile Competence Centre, 650, Route Des Lucioles, F-06921, Sophia-Antipolis Cedex, France, vol. RAN WG1, No. Nagoya, Japan, 20170918-20170921, Sep. 17, 2017 (Sep. 17, 2017), XP051339921, pp. 1-9, Retrieved from the Internet: URL: http://www.3gpp.org/ftp/Meetings_3GPP_SYNC/RAN1/Docs/ [retrieved on Sep. 17, 2017] paragraph 2.2.

International Search Report and Written Opinion—PCT/US2021/013998—ISA/EPO—May 12, 2021.

Samsung: "Discussion on Joint CLI Measurement and Beam Management", 3GPP TSG RAN WG1 Meeting #91, R1-1720307, 3rd Generation Partnership Project (3GPP), Mobile Competence Centre, 650, Route Des Lucioles, F-06921, Sophia-Antipolis Cedex, France, Dec. 1, 2017 (Dec. 1, 2017), 4 pages, XP051368955, Retrieved from the Internet: URL: http://www.3gpp.org/ftsg%5Fran/WG1%5FRL1/TSGR1%5F91/Docs/ paragraph 2.

* cited by examiner

INTERFERENCE MEASUREMENT CONFIGURATIONS IN WIRELESS SYSTEMS

CROSS REFERENCE

The present Application for Patent claims the benefit of U.S. Provisional Patent Application No. 62/964,353 by ABEDINI et al., entitled "INTERFERENCE MEASUREMENT CONFIGURATIONS IN WIRELESS SYSTEMS," filed Jan. 22, 2020, assigned to the assignee hereof, and expressly incorporated by reference herein.

FIELD OF TECHNOLOGY

The following relates generally to wireless communications and more specifically to interference measurement configurations in wireless systems.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, one or more wireless devices (base stations, wireless nodes, UEs, etc.) may experience interference. For example, a wireless device may use a reception beam to receive communications intended for the wireless device. However, the quality of the communications may be negatively impacted by interference from other signals in the wireless communications system (e.g., inter-carrier interference, cross-link interference).

SUMMARY

The described techniques relate to improved methods, systems, devices, and apparatuses that support interference measurement configurations in wireless systems.

Generally, the described techniques provide for a child wireless node or a neighboring parent node to measure interference, report interference, and coordinate to reduce interference between the child node and the parent node. Such techniques may be applicable regardless of whether the child node or the parent node is a victim node (e.g., the node being interfered with) or the aggressor node (e.g., the node causing the interference). Such interference measurement, reporting, coordination, and configuration may enable one or more wireless nodes to schedule communications based on at least one of the interference measurements, the interference reporting, or the interference coordination, which may help mitigate or prevent the effects of intra-node and inter-system interference on communications in an integrated access and backhaul (IAB) system, which may result in more efficient communications and use of network resources. As an example, the techniques described herein may leverage a parent-child relationship between wireless nodes of the TAB system in order to reduce interference between the wireless nodes without incurring additional signaling overhead, among other benefits.

In some cases, a wireless node of a wireless communications system may determine a configuration for interference measurement at the first wireless node, which may indicate a set of uplink resources for uplink reference signals and a beam sweeping configuration. The configuration may indicate one or more resource sets configured for interference measurement and may be different from resource sets configured for beam management for the first wireless node. An indication of the configuration may be received and may specify a sounding reference signal (SRS) configuration for interference measurement, which may be different from an SRS configuration to be used for beam management.

According to some aspects, the first wireless node may determine a set of transmission beams for the uplink reference signals (e.g., SRSs) based on the beam sweeping configuration, and the first wireless node may transmit the uplink reference signals via all or a portion of the transmission beams supported by the first wireless node.

A method of wireless communications at a first wireless node in a wireless communications system is described. The method may include determining a configuration for interference measurement for the first wireless node, the configuration indicating a set of uplink resources for uplink reference signals used for interference measurements and a beam sweeping configuration for transmission of the uplink reference signals, determining a set of transmission beams for the uplink reference signals based on the beam sweeping configuration, and transmitting, to a second wireless node in the wireless communications system, the uplink reference signals via the set of uplink resources and the set of transmission beams in accordance with the beam sweeping configuration.

An apparatus for wireless communications at a first wireless node in a wireless communications system is described. The apparatus may include a processor, memory coupled with the processor, and instructions stored in the memory. The instructions may be executable by the processor to cause the apparatus to determine a configuration for interference measurement for the first wireless node, the configuration indicating a set of uplink resources for uplink reference signals used for interference measurements and a beam sweeping configuration for transmission of the uplink reference signals, determine a set of transmission beams for the uplink reference signals based on the beam sweeping configuration, and transmit, to a second wireless node in the wireless communications system, the uplink reference signals via the set of uplink resources and the set of transmission beams in accordance with the beam sweeping configuration.

Another apparatus for wireless communications at a first wireless node in a wireless communications system is described. The apparatus may include means for determining a configuration for interference measurement for the first wireless node, the configuration indicating a set of uplink resources for uplink reference signals used for interference measurements and a beam sweeping configuration for transmission of the uplink reference signals, determining a set of transmission beams for the uplink reference signals based on the beam sweeping configuration, and transmitting, to a second wireless node in the wireless communications system, the uplink reference signals via the set of uplink resources and the set of transmission beams in accordance with the beam sweeping configuration.

A non-transitory computer-readable medium storing code for wireless communications at a first wireless node in a wireless communications system is described. The code may include instructions executable by a processor to determine a configuration for interference measurement for the first wireless node, the configuration indicating a set of uplink resources for uplink reference signals used for interference measurements and a beam sweeping configuration for transmission of the uplink reference signals, determine a set of transmission beams for the uplink reference signals based on the beam sweeping configuration, and transmit, to a second wireless node in the wireless communications system, the uplink reference signals via the set of uplink resources and the set of transmission beams in accordance with the beam sweeping configuration.

Some examples of the method, apparatuses, and non-transitory computer-readable medium described herein may further include operations, features, means, or instructions for receiving, from the second wireless node or another wireless node in the wireless communications system, an indication of the configuration for interference measurement.

In some examples of the method, apparatuses, and non-transitory computer-readable medium described herein, the configuration may be received semi-statically or dynamically.

In some examples of the method, apparatuses, and non-transitory computer-readable medium described herein, the indication specifies an SRS configuration for interference measurement different from an SRS configuration for beam management.

Some examples of the method, apparatuses, and non-transitory computer-readable medium described herein may further include operations, features, means, or instructions for transmitting a report indicating that the first wireless node supports using an SRS configuration for interference measurement for the first wireless node.

In some examples of the method, apparatuses, and non-transitory computer-readable medium described herein, the report may be transmitted semi-statically or dynamically.

In some examples of the method, apparatuses, and non-transitory computer-readable medium described herein, the configuration indicates one or more resource sets configured for interference measurement for the first wireless node, the one or more resource sets different from resource sets configured for beam management for the first wireless node.

Some examples of the method, apparatuses, and non-transitory computer-readable medium described herein may further include operations, features, means, or instructions for determining the set of transmission beams to be all transmission beams supported by the first wireless node, and transmitting the uplink reference signals via all the transmission beams supported by the first wireless node.

Some examples of the method, apparatuses, and non-transitory computer-readable medium described herein may further include operations, features, means, or instructions for identifying a codebook for interference measurement based on the beam sweeping configuration, where the codebook may be different from codebooks for other communications by the first wireless node.

Some examples of the method, apparatuses, and non-transitory computer-readable medium described herein may further include operations, features, means, or instructions for determining a direction of communication for the first wireless node, determining the set of transmission beams based on the direction, and transmitting the uplink reference signals using the set of transmission beams in the direction of communication.

In some examples of the method, apparatuses, and non-transitory computer-readable medium described herein, the direction may be associated with one or more parent nodes or one or more child nodes of the first wireless node.

In some examples of the method, apparatuses, and non-transitory computer-readable medium described herein, the direction may be associated with one or more backhaul links of the first wireless node.

Some examples of the method, apparatuses, and non-transitory computer-readable medium described herein may further include operations, features, means, or instructions for transmitting an indication of a number of transmission beams for beam sweeping via the set of uplink resources using the set of transmission beams.

Some examples of the method, apparatuses, and non-transitory computer-readable medium described herein may further include operations, features, means, or instructions for receiving, in response to the indication, the configuration for interference measurement, the configuration allocating resources for interference measurement based on the number of transmission beams.

In some examples of the method, apparatuses, and non-transitory computer-readable medium described herein, the indication may be transmitted semi-statically or dynamically.

Some examples of the method, apparatuses, and non-transitory computer-readable medium described herein may further include operations, features, means, or instructions for receiving the configuration for interference measurement for the first wireless node, the configuration indicating a resource allocation for SRS resources, the resource allocation indicating one or more consecutive symbols within a slot for transmitting the uplink reference signals.

Some examples of the method, apparatuses, and non-transitory computer-readable medium described herein may further include operations, features, means, or instructions for receiving an uplink reference signal configuration for a third wireless node in the wireless communications system, monitoring for one or more uplink reference signals from the third wireless node based on the uplink reference signal configuration, and performing interference measurement of the third wireless node based on the one or more uplink reference signals.

In some examples of the method, apparatuses, and non-transitory computer-readable medium described herein, the uplink reference signal configuration for the third wireless node may be received from the second wireless node or the third wireless node.

In some examples of the method, apparatuses, and non-transitory computer-readable medium described herein, the first wireless node and the second wireless node may be in a parent-child relationship.

A method of wireless communications at a first wireless node in a wireless communications system is described. The method may include identifying a configuration for interference measurement for the first wireless node, the configuration indicating a set of uplink resources configured for a second wireless node and a beam sweeping configuration for the second wireless node, monitoring, via a set of reception beams, the set of uplink resources configured for a set of uplink reference signals from the second wireless node in accordance with the beam sweeping configuration, and performing an interference measurement on the set of uplink reference signals based on the monitoring.

An apparatus for wireless communications at a first wireless node in a wireless communications system is described. The apparatus may include a processor, memory coupled with the processor, and instructions stored in the memory. The instructions may be executable by the processor to cause the apparatus to identify a configuration for interference measurement for the first wireless node, the configuration indicating a set of uplink resources configured for a second wireless node and a beam sweeping configuration for the second wireless node, monitor, via a set of reception beams, the set of uplink resources configured for a set of uplink reference signals from the second wireless node in accordance with the beam sweeping configuration, and perform an interference measurement on the set of uplink reference signals based on the monitoring.

Another apparatus for wireless communications at a first wireless node in a wireless communications system is described. The apparatus may include means for identifying a configuration for interference measurement for the first wireless node, the configuration indicating a set of uplink resources configured for a second wireless node and a beam sweeping configuration for the second wireless node, monitoring, via a set of reception beams, the set of uplink resources configured for a set of uplink reference signals from the second wireless node in accordance with the beam sweeping configuration, and performing an interference measurement on the set of uplink reference signals based on the monitoring.

A non-transitory computer-readable medium storing code for wireless communications at a first wireless node in a wireless communications system is described. The code may include instructions executable by a processor to identify a configuration for interference measurement for the first wireless node, the configuration indicating a set of uplink resources configured for a second wireless node and a beam sweeping configuration for the second wireless node, monitor, via a set of reception beams, the set of uplink resources configured for a set of uplink reference signals from the second wireless node in accordance with the beam sweeping configuration, and perform an interference measurement on the set of uplink reference signals based on the monitoring.

Some examples of the method, apparatuses, and non-transitory computer-readable medium described herein may further include operations, features, means, or instructions for scheduling communications for the first wireless node or a third wireless node based on the interference measurement.

In some examples of the method, apparatuses, and non-transitory computer-readable medium described herein, identifying the configuration for interference measurement may include operations, features, means, or instructions for receiving, from a central unit, an indication of the configuration for interference measurement for the first wireless node.

Some examples of the method, apparatuses, and non-transitory computer-readable medium described herein may further include operations, features, means, or instructions for selecting the set of reception beams from reception beams supported by the first wireless node based on a communication direction of the first wireless node.

In some examples of the method, apparatuses, and non-transitory computer-readable medium described herein, the communication direction corresponds to a parent node or a child node of the first wireless node, or one or more backhaul links associated with the first wireless node.

Some examples of the method, apparatuses, and non-transitory computer-readable medium described herein may further include operations, features, means, or instructions for transmitting, to at least one of the second wireless node or a central unit, a report indicating a result of the interference measurement.

In some examples of the method, apparatuses, and non-transitory computer-readable medium described herein, the configuration indicates a transmission power associated with the set of uplink reference signals, and the set of uplink reference signals includes one or more SRSs.

A method of wireless communications at a central unit of a wireless communications system is described. The method may include transmitting, to a first wireless node of the wireless communications system, a configuration for interference management, the configuration indicating a set of uplink resources and a beam sweeping configuration for a set of uplink reference signals, receiving, from a second wireless node, a report indicating interference measurements in accordance with the configuration, and transmitting scheduling information to the first wireless node or the second wireless node based on the report, the scheduling information including a resource allocation for communications for the first wireless node or the second wireless node.

An apparatus for wireless communications at a central unit of a wireless communications system is described. The apparatus may include a processor, memory coupled with the processor, and instructions stored in the memory. The instructions may be executable by the processor to cause the apparatus to transmit, to a first wireless node of the wireless communications system, a configuration for interference management, the configuration indicating a set of uplink resources and a beam sweeping configuration for a set of uplink reference signals, receive, from a second wireless node, a report indicating interference measurements in accordance with the configuration, and transmit scheduling information to the first wireless node or the second wireless node based on the report, the scheduling information including a resource allocation for communications for the first wireless node or the second wireless node.

Another apparatus for wireless communications at a central unit of a wireless communications system is described. The apparatus may include means for transmitting, to a first wireless node of the wireless communications system, a configuration for interference management, the configuration indicating a set of uplink resources and a beam sweeping configuration for a set of uplink reference signals, receiving, from a second wireless node, a report indicating interference measurements in accordance with the configuration, and transmitting scheduling information to the first wireless node or the second wireless node based on the report, the scheduling information including a resource allocation for communications for the first wireless node or the second wireless node.

A non-transitory computer-readable medium storing code for wireless communications at a central unit of a wireless communications system is described. The code may include instructions executable by a processor to transmit, to a first wireless node of the wireless communications system, a configuration for interference management, the configuration indicating a set of uplink resources and a beam sweeping configuration for a set of uplink reference signals, receive, from a second wireless node, a report indicating interference measurements in accordance with the configuration, and transmit scheduling information to the first wireless node or the second wireless node based on the report, the scheduling information including a resource allocation for communications for the first wireless node or the second wireless node.

In some examples of the method, apparatuses, and non-transitory computer-readable medium described herein, the configuration indicates a set of reception beams for the second wireless node to be used for the interference measurements.

In some examples of the method, apparatuses, and non-transitory computer-readable medium described herein, the first wireless node may be a child or a grandchild of the central unit.

In some examples of the method, apparatuses, and non-transitory computer-readable medium described herein, the configuration indicates a transmission power associated with the set of uplink reference signals, and the set of uplink reference signals includes one or more SRSs.

DETAILED DESCRIPTION

Figure 1:
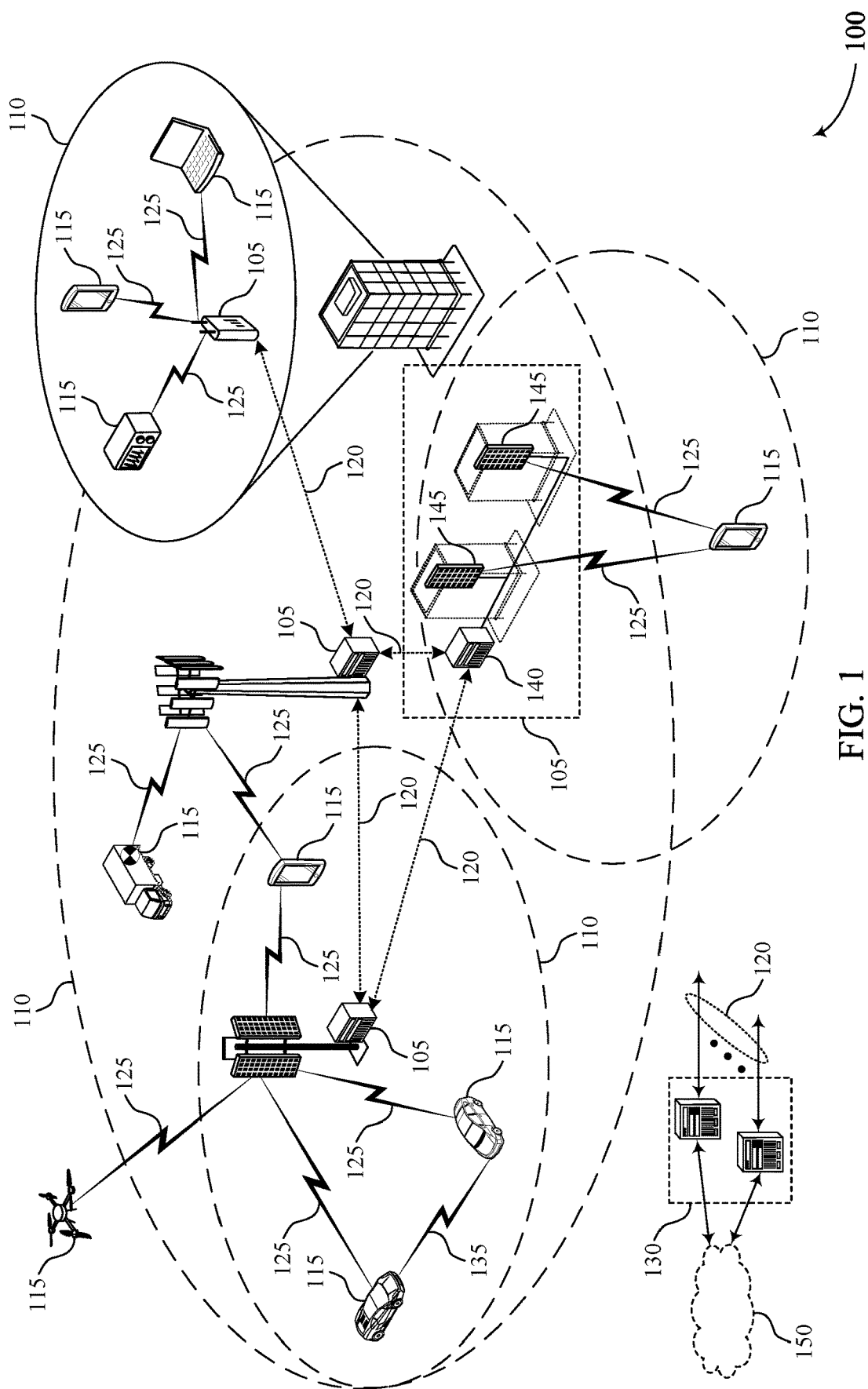
FIG. 1 illustrates an example of a wireless communications system that supports interference measurement configurations in wireless systems in accordance with aspects of the present disclosure.

Some wireless communications systems may include wireless access nodes (ANs) (e.g., base stations) to facilitate wireless communications between a user equipment (UE) and a network. In some cases, an anchor AN may have a high-capacity, wired, backhaul connection (e.g., fiber) to the network, while communicating with one or more ANs (e.g., relay devices) or UEs, which may be referred to as child nodes. In some examples, an anchor AN may be referred to as a donor node or a parent node. A network that supports communications between a base station and a UE may be referred to as an access network, while a network that supports communications between multiple base stations may be referred to as a backhaul network. Some wireless communications systems may support both an access network and a backhaul network (e.g., an integrated access and backhaul (IAB) network).

In deployments supporting both access and backhaul over wireless communication links (e.g., in an IAB network), an IAB node such as a parent node or a child node may experience communication failures. That is, conditions may exist that may cause interference, blockage, etc. on a communication beam (e.g., an active beam of an antenna element). For example, a first wireless node (e.g., a wireless AN in an IAB network, a UE, a base station, among other examples of network equipment) may use a reception beam to receive communications from a second wireless node. In some examples, the first wireless node may be a child node and the second node may be a neighboring parent node. However, the reception beam may also receive interference from other signals in the system (e.g., other transmission beams of the second wireless node, transmission beams of a third wireless node, or both). In such examples, the first wireless node may be referred to as a victim wireless node and wireless nodes corresponding to the interfering signals may be referred to as aggressor wireless nodes. Such interference may result in a link failure, miscommunications, a reduced data rate, etc.

Accordingly, the techniques described herein may enable one or both of a child wireless node or a neighboring parent node to more efficiently measure interference, report interference, and coordinate to reduce interference between the child node and the parent node regardless of whether the child node or the parent node is the victim node or the aggressor node. Such interference measurement, reporting, coordination, and interference measurement configuration may enable one or more wireless nodes to schedule communications based on at least one of the interference measurements, the interference reporting, or the interference coordination, which may mitigate the effects of intra-node and inter-system interference on communications in an IAB system while ensuring efficient communications. As an example, the techniques described herein may leverage a parent-child relationship between wireless nodes of the IAB system in order to reduce interference between the wireless nodes without incurring additional signaling overhead, among other benefits.

In some examples, a wireless node of a wireless communications system may determine a configuration for interference measurement for the first wireless node. For example, the configuration determined by the first wireless node may indicate a set of uplink resources for uplink reference signals and a beam sweeping configuration. For example, the uplink reference signals may be used for interference measurements and the beam sweeping configuration may be a beam sweeping configuration for transmission of the uplink reference signals. In some examples, the configuration may be received by the first wireless node semi-statically or dynamically. Additionally or alternatively, the configuration may indicate one or more resource sets configured for interference measurement. For example, the one or more resource sets may be different from resource sets configured for beam management for the first wireless node. In some examples, the first wireless node may receive an indication of the configuration for interference measurement from another node. Additionally or alternatively, the indication of the configuration may specify a sounding reference signal (SRS) configuration for interference measurement. In such examples, the SRS configuration to be used for interference measurement may be different from an SRS configuration to be used for beam management.

In some examples, the first wireless node may determine a set of transmission beams for the uplink reference signals based on the beam sweeping configuration indicated by the configuration determined by the first wireless node. In some examples, the first wireless node may determine that the set of transmission beams may be all transmission beams supported by the first wireless node or by a second wireless node. Additionally or alternatively, the first wireless node may transmit the uplink reference signals via all of the transmission beams supported by the first wireless node.

In some examples, the first wireless node may transmit the uplink reference signals to the second wireless node in the wireless communications system. For example, the first wireless node may transmit the uplink reference signals to the second wireless node via the set of uplink resources and the via the set of transmission beams according to the beam sweeping configuration determined by the first wireless node.

Aspects of the disclosure are initially described in the context of wireless communications systems. Additional aspects of the disclosure are described with reference to a process flow. Aspects of the disclosure are further illustrated by and described with reference to apparatus diagrams, system diagrams, and flowcharts that relate to measurement report techniques for wireless communications systems.

FIG. 1 illustrates an example of a wireless communications system 100 that supports interference measurement configurations in wireless systems in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s = 1/$ $(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., Alf) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions.

The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, for example, in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals.

For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

As described herein, the devices of the wireless communications system 100 may use techniques for interference measurement configuration. For example, a wireless node (e.g., in an IAB system) may be enabled to determine a configuration for interference measurement for the wireless node in the wireless communications system 100 and the determined configuration may indicate a set of uplink resources and a beam sweeping configuration. The wireless node may further be enabled to determine a set of transmission beams for uplink reference signals based on the beam sweeping configuration and may transmit the uplink reference signals via the uplink resources and the transmission beams to another wireless node or another portion of the wireless communications system 100. As an example, a wireless node may have a parent-child relationship with another wireless node (e.g., a parent wireless node in the wireless communications system 100 may establish a communication link 125 with a child wireless node). In an example, the parent-child relationship (e.g., the established communication link 125) may facilitate determination of a configuration for interference measurement between the parent wireless node and the child wireless node because of the existing relationship between the parent wireless node and the child wireless node and the accompanying knowledge each node has about the other node.

In some examples, a child node of a parent-child relationship within the wireless communications system 100 may receive an indication of a configuration for interference measurement from a parent node of the parent-child relationship via a communications link 125. Such an indication may be received by the child node semi-statically or dynamically. Additionally or alternatively, the parent node of the parent-child relationship may receive the indication of the configuration for interference measurement from the child node. In some examples, the received indication may specify a SRS configuration for interference measurement that is different from an SRS configuration used for beam management. Additionally or alternatively, one of the parent node or the child node may transmit via the communications link 125, or any other type of communications link, a report indicating that the transmitting node supports using the SRS configuration for interference measurement within the wireless communications system 100.

Figure 2:
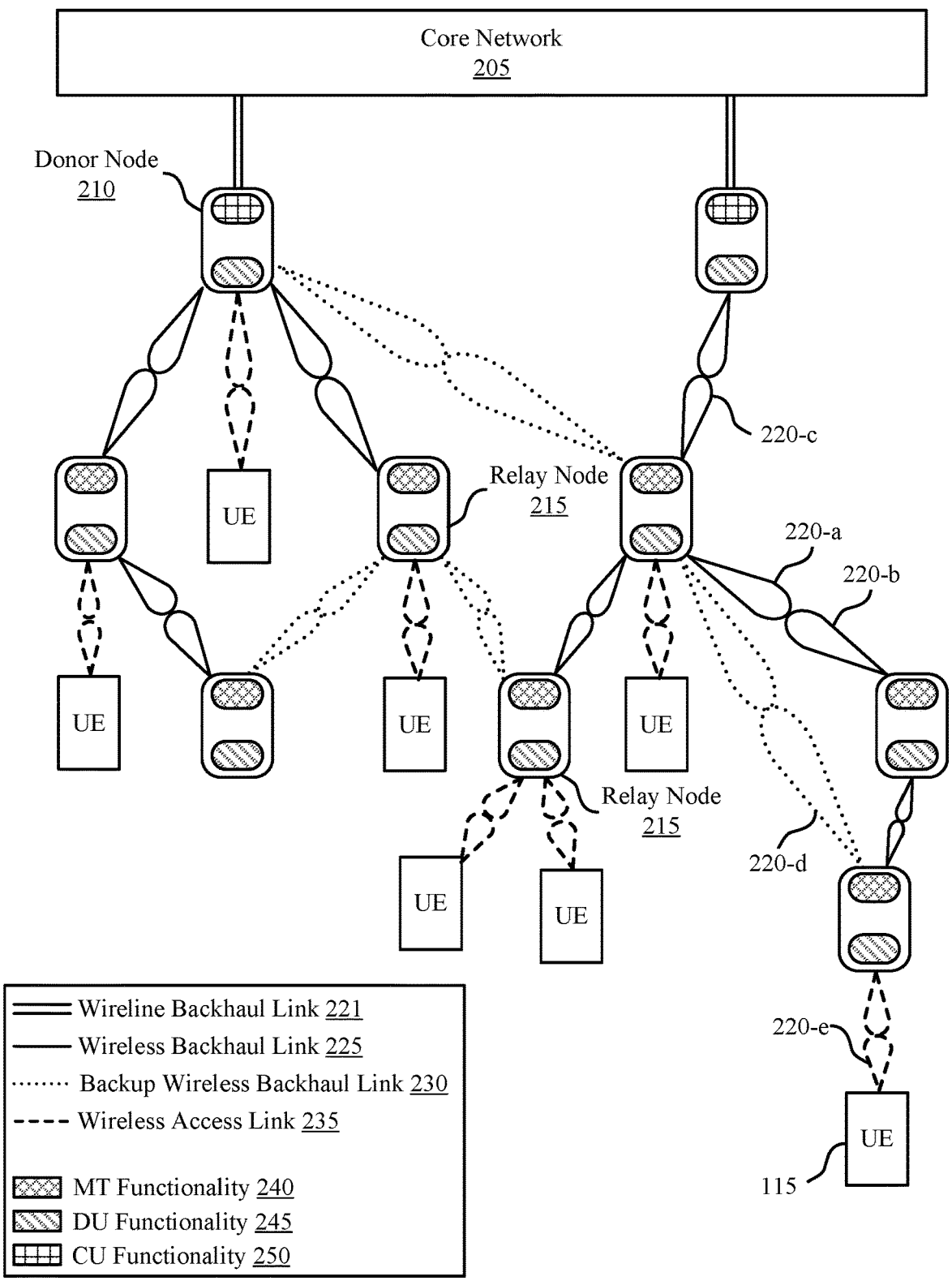
FIG. 2 illustrates an example of a wireless communications system that supports interference measurement configurations in wireless systems in accordance with aspects of the present disclosure.

FIG. 2 illustrates an example of a wireless communications system 200 that supports interference measurement configurations in wireless systems in accordance with aspects of the present disclosure. In some examples, wireless communications system 200 may implement aspects of wireless communications system 100.

Wireless communications system 200 (e.g., an NR system) may supplement wireline backhaul connections (e.g., wireline backhaul links 220) by sharing infrastructure and spectral resources for network access with wireless backhaul link capabilities, providing an IAB network architecture. Wireless communications system 200 may include a core network 205 and base stations 105 or supported devices split into one or more support entities (i.e., functionalities) for promoting wireless backhaul density in collaboration with communication access. Aspects of the supporting functionalities of the base stations 105 may be referred to as wireless IAB nodes, such as IAB donor nodes 210 (also referred to herein as donor nodes 210) and IAB relay nodes 215 (also referred to herein as relay nodes 215). Wireless communications system 200 may additionally support a number of UEs 115, which may communicate on the uplink with one or more IAB donor nodes 210, IAB relay nodes 215, or a combination of these devices. In some examples, wireless communications system 200 may implement aspects of wireless communications system 100.

Wireless communications system 200 may include one or more IAB donor nodes 210, which may interface between a wireline network and a wireless network. In some cases, an IAB donor node 210 may be referred to as an anchor node, as the IAB donor node 210 anchors the wireless network to a wireline connection. For example, each IAB donor node 210 may include at least one wireline backhaul link 221 and one or more additional links (e.g., wireless backhaul links 225, backup wireless backhaul links 230, wireless access links 235, etc.). As illustrated herein, the various wireless links in the wireless communications system 200 may also include one or more beams 220 (e.g., beam pairs including a reception beam and a transmission beam between the various wireless nodes). An IAB donor node 210 may be split into associated base station central unit (CU) 250 and distributed unit (DU) 245 entities, where one or more DUs 245 associated with an IAB donor node 210 may be partially controlled by an associated CU 250. CUs 250 of IAB donor nodes 210 may host layer 3 (L3) (e.g., radio resource control (RRC), service data adaption protocol (SDAP), packet data convergence protocol (PDCP), etc.) functionality and signaling. Further, CUs 250 of IAB donor nodes 210 may communicate with the core network 205 over a wireline backhaul link 221 (e.g., which may be referred to as an NG interface). DUs 245 may host lower layer operations, such as layer 1 (L1) or layer 2 (L2) (e.g., radio link control (RLC), media access control (MAC), physical (PHY) layer, etc.) functionality and signaling. A DU 245 entity of an IAB donor node 210 may support a serving cell within the network coverage area according to connections associated with wireless backhaul links 225 and wireless access links 235 of the IAB network. DUs 245 of the IAB donor nodes 210 may control both access and backhaul links within the corresponding network coverage and may provide controlling and scheduling for descendant (i.e., child) IAB relay nodes 215 and or UEs 115. For example, a DU 245 may support an RLC channel connection with a UE 115 (e.g., via an access link 235) or with an IAB relay node 215 (e.g., via a backhaul link, such as a primary wireless backhaul link 225 or a backup wireless backhaul link 230).

IAB relay nodes 215 may be split into associated mobile terminal (MT) 240 and base station DU 245 entities, where MT 240 functionality of the IAB relay nodes 215 may be controlled or scheduled by antecedent (i.e., parent) IAB nodes via wireless backhaul links. A parent node to an IAB relay node 215 (i.e., a child node) may be another (antecedent) IAB relay node 215 or an IAB donor node 210. The MT 240 functionality may be similar to functionality performed by UEs 115 in the system. An IAB relay node 215 may be indirectly connected to a wireline backhaul 220. For example, the IAB relay node 215 may connect to the core network 205 via other IAB nodes (e.g., any number of additional IAB relay nodes 215 and an IAB donor node 210) using wireless backhaul links. The IAB relay node 215 may transmit upstream (e.g., towards the core network 205) in the IAB system using MT 240 functionality. In some cases, DUs 245 of the IAB relay nodes 215 may be partially controlled by signaling messages from CU 250 entities of an associated IAB donor node 210 (e.g., transmitted via an F1-application protocol (AP)). The DUs 245 of the IAB relay nodes 215 may support serving cells of the network coverage area. For example, a DU 245 of an IAB relay node 215 may perform the same or similar functions as a DU 245 of an IAB donor node 210, supporting one or more wireless access links 235 for UEs 115, one or more wireless backhaul links for downstream IAB relay nodes 215, or both.

Wireless communications system 200 may employ relay chains for communications within the IAB network architecture. For example, a UE 115 may communicate with an IAB node, and the IAB node may relay the data to a base station CU 250 (e.g., a network entity or network device) or the core network 205 either directly or via one or more IAB relay nodes 215. Each IAB relay node 215 may include a primary wireless backhaul link 225 for relaying data upstream or receiving information from a base station CU 250 or the core network 205. In some cases, an IAB relay node 215 may additionally include one or more backup wireless backhaul links 230 (e.g., for redundant connectivity or improved robustness). If the primary wireless backhaul link 225 fails (e.g., due to interference, malfunction at a connected IAB node, movement of IAB nodes, maintenance at IAB nodes, etc.), an IAB relay node 215 may utilize a backup wireless backhaul link 230 for backhaul communication within the IAB network. The first (e.g., primary) wireless backhaul link 225 may be associated with a coverage area and MT 240 functionality may be controlled or scheduled by a first parent node. The one or more secondary backhaul links (e.g., backup wireless backhaul links 230) may be associated with a non-collocated coverage area and controlled or scheduled by one or more parent nodes. Each of the primary backhaul connections and the one or more secondary connections may support spectral capabilities to provide network communication over one or more radio access technologies. The one or more IAB nodes may further support base station DU 245 entities and may support multiple backhaul and wireless access links within the relay chain. The DU 245 entities may control or schedule descendant IAB relay nodes 215 and UEs 115 within the IAB network (e.g., downstream in the IAB network) via the configured backhaul and wireless access links. That is, an IAB relay node 215 may act as a relay between an IAB donor node 210 and one or more descendant devices (e.g., other IAB relay nodes 215, UEs 115, etc.) in both communication directions based on established backhaul and access connections.

The operations performed by the wireless devices in the wireless communications system 200 may be static or dynamic. For example, in a dynamic IAB system, a wireless device may function as an IAB donor node 210, an IAB relay node 215, a parent node, a child node, or any combination of these. In some cases, wireless devices may dynamically switch between the different roles in the IAB system (e.g., based on configurations, channel conditions, neighboring devices, etc.). In other cases, wireless devices may function in multiple different roles at the same time (e.g., a single wireless device, such as a base station 105 or UE 115, may act as a parent node for one wireless device and a child node for another wireless device).

In some examples, there may be interference between one or more communications of the wireless communications system 200. As an illustrative example, a wireless node (e.g., an IAB relay node 215, an IAB donor node 210, or a UE 115) may receive or transmit communications using one or more beams 220 corresponding to a communications link (e.g., a wireless backhaul link 225, a backup wireless backhaul link 230, a wireless access link 235, etc.). For instance, a wireless node may receive signals carried by a transmission beam 220-*a* using a reception beam 220-*b*. In such examples, the transmission beam 220-*a* may be referred to as a serving beam (e.g., carrying signals intended for the wireless node). However, the other communications in the wireless communications system 200 may interfere with the reception of the signals of the transmission beam 220-*a*. For example, transmission beams 220-*c*, 220-*d*, 220-*e*, or any combination thereof may be picked up by the reception beam 220-*b*, which may result in relatively inefficient communications.

As described herein, the devices of wireless communications system 200 (e.g., IAB relay nodes 215, IAB donor nodes 210, a CU 250, a DU, or a combination thereof) may use interference measurement configuration techniques. For example, a wireless node (e.g., an IAB relay node 215, an IAB donor node 210, or a UE 115) may be enabled to determine a configuration for interference measurement for the wireless node in the wireless communications system 200 (e.g., interfering signals of transmission beams 220-*c*, 220-*d*, 220-*e*, etc. at a reception beam 220-*b*) and the determined configuration may indicate a set of uplink resources and a beam sweeping configuration. The wireless node may further be enabled to determine a set of transmission beams for uplink reference signals based on the beam sweeping configuration and may transmit the uplink reference signals via the uplink resources and the transmission beams to another wireless node or another portion of the wireless communications system 200. As an example, a wireless node may have a parent-child relationship with another wireless node (e.g., a parent wireless node in the wireless communications system 200 may establish a wireless backhaul link 225 with a child wireless node). In some examples, the parent-child relationship (e.g., the established wireless backhaul link 225) may facilitate determination of a configuration for interference measurement between the parent wireless node and the child wireless node because of the existing relationship between the parent wireless node and the child wireless node and the accompanying knowledge each node has about the other node.

In some examples, a child node of a parent-child relationship within the wireless communications system 200 may receive an indication of a configuration for interference measurement from a parent node of the parent-child relationship via a wireless backhaul link 225. Such an indication may be received by the child node semi-statically or dynamically. Additionally or alternatively, the parent node of the parent-child relationship may receive the indication of the configuration for interference measurement from the child node. In some examples, the received indication may specify an SRS configuration for interference measurement that is different from an SRS configuration used for beam management. Additionally or alternatively, one of the parent node or the child node may transmit via the wireless backhaul link 225, or any other type of communications link, a report indicating that the transmitting node supports using the SRS configuration for interference measurement within the wireless communications system 200.

Figure 3:
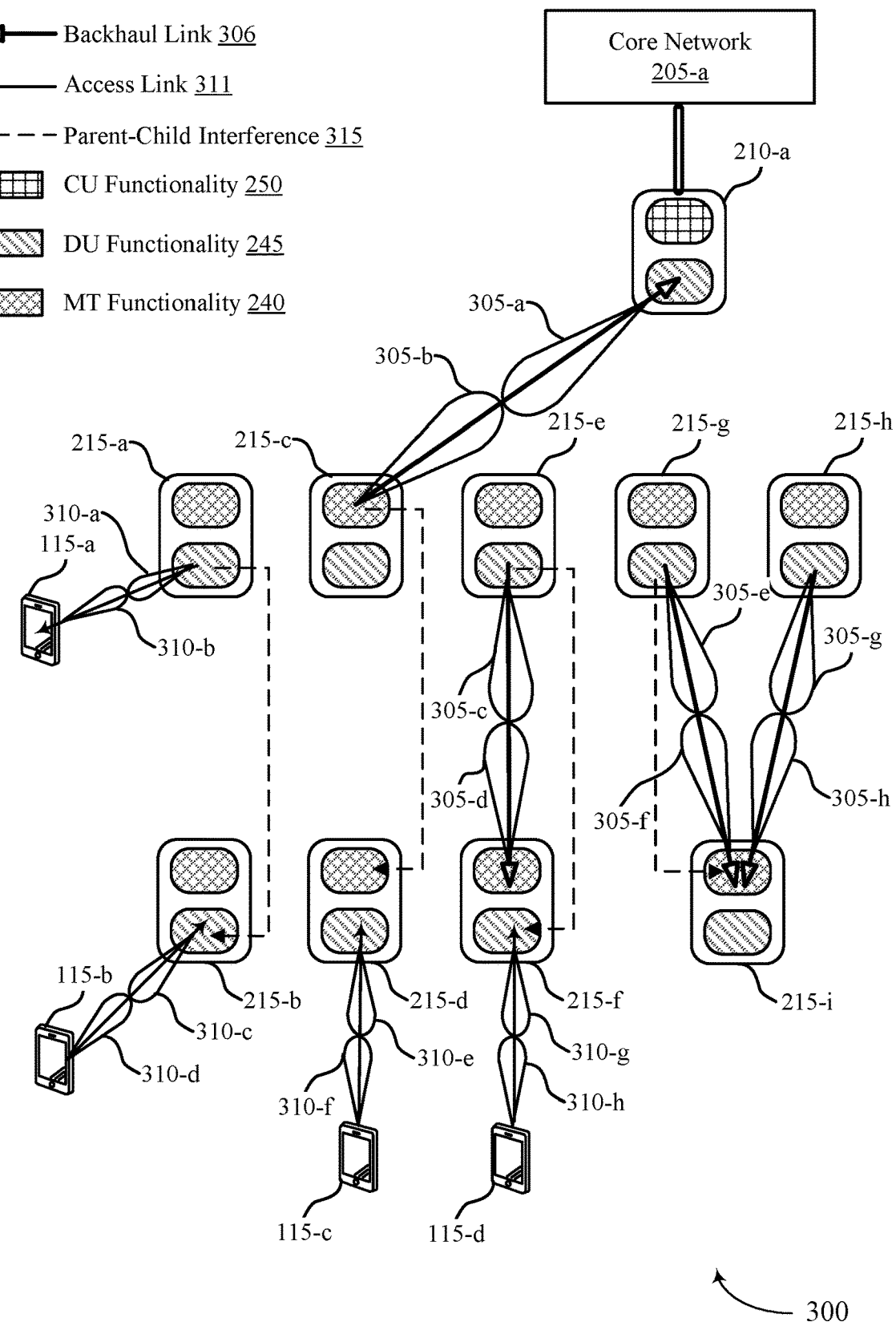
FIG. 3 illustrates an example of a wireless communications system that supports interference measurement configurations in wireless systems in accordance with aspects of the present disclosure.

FIG. 3 illustrates an example of a wireless communications system 300 that supports interference measurement configurations in wireless systems in accordance with aspects of the present disclosure. Wireless communications system 300 may implement aspects of the wireless communications system 100 or the wireless communications system 200. For example, the wireless communications system 300 may include one or more wireless devices (e.g., wireless IAB nodes), such as a core network 205-*a*, IAB donor nodes 210, IAB relay nodes 215, UEs 115, among other examples of devices and aspects of the wireless communications systems 100 and 200. Generally, the wireless communications system 300 shows illustrative examples of various interference scenarios for communications between the wireless devices.

The wireless communications system 300 may support communications between various wireless nodes, such as a core network 205-*a*, one or more IAB donor nodes 210, IAB relay nodes 215, or UEs 115. For example, the various wireless nodes may transmit signals (e.g., via transmission beams at a wireless node) or receive signals (e.g., via reception beams at a wireless node) using one or more backhaul links 306 or access links 311, which may be examples of wireless backhaul links 225 and wireless access links 235 as described here with reference to FIG. 2, respectively. More specifically, the IAB relay nodes 215 may communicate with other IAB relay nodes 215 or the IAB donor nodes 210 via one or more backhaul links 306 (also referred to herein as beams 305, for example, beam 305-*a* through beam 305-*h*) (e.g., beam pairs including a reception beam and a transmission beam extending between the IAB relay nodes 215 or the IAB donor nodes 210) using the backhaul links 306 (also referred to herein as beams 305). The IAB relay nodes 215 may also communicate with UEs 115 via one or more access links 311 (also referred to herein as beams 310, for example, beam 310-*a* through beam 310-*h*) (e.g., beam pairs including a reception beam and a transmission beam extending between the IAB relay nodes 215 and the UEs 115).

With reference to FIG. 3, a portion of the IAB relay nodes 215 are illustrated as experiencing interferences 315, for example, at one or more reception beams of the wireless nodes. Although illustrated as interference 315 being received at the antennas of child nodes (e.g., the IAB relay nodes 215-*b*, 215-d, 215-*f*, and 215-*i*) for illustrative clarity, it is to be understood that the interference 315 may be received at one or more parent nodes (e.g., the IAB relay nodes 215-*a*, 215-*c*, 215-*e*, 215-*g*, and 215-*h*) or a grandparent node (e.g., the IAB donor node 210-*a*). In some examples, the wireless nodes may implement aspects of TDD techniques (e.g., dynamic TDD or static TDD), spatial divisional multiplexing (SDM) techniques (e.g., SDM techniques with adjacent hops across IAB nodes or co-channel diversity combining (DC) with SDM techniques, etc.), which may result in cross-link interference (CLI) or intercarrier interference (ICI) in the wireless communications system 300, among other examples of interference.

As one illustrative example, an IAB relay node 215-*a* (e.g., a parent node or a child node) may establish communications with a UE 115-*a* (e.g., via an access link 311) and an IAB relay node 215-*b* may establish communications with a UE 115-*b*. For example, the IAB relay node 215-*b* may use a reception beam 310-*c* of the IAB relay node 215-*b* to receive a signal from the UE 115-*b* (e.g., via a transmission beam of the UE 115-*b*). The reception beam of the IAB relay node 215-*b* may also receive interference 315 from signals of the IAB relay node 215-*a* (or from the UE 115-*a*). For example, the IAB relay node 215-*a* may transmit a signal via a transmission beam of the IAB relay node 215-*a* and the signal may result in interference 315 at the reception beam of the IAB relay node 215-*b*. In such examples, the IAB relay node 215-*a* may be referred to as an aggressor wireless node and the IAB relay node 215-*b* may be referred to as a victim wireless node.

In some examples, the IAB relay node 215-*d* may be an example of a victim wireless node. For example, a reception beam 310-*e* of the IAB relay node 215-*d* (e.g., receiving signals over a communication link with the UE 115-*c*) may receive interference 315 from communications between the IAB relay node 215-*c* and the IAB donor node 210-*a*. In some examples, the IAB relay node 215-*f* may be an example of a victim wireless node. A reception beam 310-*g* of the IAB relay node 215-*f* (e.g., receiving signals over an access link 311 from the UE 115-*d*) may receive interference 315 from communications between the IAB relay node 215-*e* and the IAB relay node 215-*f*. That is, the IAB relay node 215-*e* may transmit a signal to the IAB relay node 215-*f* (e.g., using a transmission beam of the IAB relay node 215-*e*) and the reception beam may receive interference 315 from the signal from the IAB relay node 215-*e*, for example, when the reception beam is paired to a transmission beam of the UE 115-*d*, which may degrade the quality of communications between the IAB relay node 215-*f* and the UE 115-*d*. In some examples, the IAB relay node 215-*i* may be an example of a victim wireless node. For example, the IAB relay node 215-*i* may receive a signal from the IAB relay node 215-*g* using a first reception beam and a signal from the IAB relay node 215-*h* using a second reception beam. However, the signal intended for the second reception beam may cause interference with the signal intended for the first reception beam, or vice versa. In some examples, some or all of the victim nodes described in FIG. 3 may additionally or alternatively receive interference 315 from an aggressor wireless node that does not have a parent-child relationship with the victim node or is not included in the IAB network described herein.

Although illustrated with the various access link communications and interference 315 being transmitted in one direction for illustrative clarity, in some examples some or all of the illustrated directions may be reversed or may be directed at different devices than shown. As one illustrative example, the IAB relay node 215-*b* may use a transmission beam to transmit a signal to the UE 115-*b*, and a reception beam of the IAB relay node 215-*a* may receive interference 315 based on the transmitted signal to the UE 115-*b*. In such examples, the IAB relay node 215-*a* may be referred to as a victim wireless node and the UE 115-*b* may be referred to as an aggressor wireless node.

The techniques described herein may enable the various devices of the wireless communications system 300 to reduce the impact or likelihood of the interference 315. For example, the wireless communications system 300 may implement techniques for interference measurement between a parent node and a child node using sounding reference signal based interference measurement. Accordingly, a wireless node (e.g., a victim wireless node or an aggressor wireless node) may be enabled to perform interference measurement of communications between the wireless node and another wireless node (e.g., the corresponding other of the victim wireless node or the aggressor wireless node) in the wireless communications system 300. The wireless node may report the interference measurement or may take action based on its knowledge of the other node due to the parent-child relationship between the two wireless nodes. The parent-child relationship between the two wireless nodes may facilitate more efficiently coordination between the two nodes to reduce interference.

A parent node, for example one of the IAB relay nodes 215, may have a first number of transmission and reception beam candidates available for communicating with a corresponding child node, which may be another one of the IAB relay nodes 215. In some cases, at least some of the transmission or reception beam candidates may be associated with the MT 240 of the parent node (e.g., IAB relay node 215) as part of the backhaul link 305 extending between the parent node (e.g., IAB relay node 215) and a grandparent node, such as one of the IAB donor nodes 210. One or more relay nodes 215, acting as a child node, may have a second number of transmission and reception beam candidates available for communicating with the corresponding one or more parent nodes, such as one or more of the IAB relay nodes 215. In some cases, one or more of the transmission or the reception beams may be associated with the MT 240 or the DU 245 of one or more of the child nodes (e.g., IAB relay nodes 215). In some cases, each of the parent nodes (e.g., IAB relay nodes 215) and the child nodes (e.g., IAB relay nodes 215) may determine a reference signal received power (RSRP) or received signal strength indicator (RSSI) interference matrix.

In some cases, the MT 240 of one or more of the child nodes (e.g., IAB relay nodes 215) or the parent nodes (e.g., IAB relay nodes 215) may be configured with one or more SRS resource sets. For examples, each SRS resource set may be configured with 16, 32, or 64 resources. In some cases, one or more of the resource sets, the resources, or the resources per set for each MT 240 may be increased by a factor ranging from 2 to 4 to facilitate sweeping of beams along more directions by the MT 240 during uplink functionality. In some examples, the each of the MT 240 of each of the child nodes (e.g., IAB relay nodes 215) may perform beam sweeping in one or more differing directions which may be associated with other types of communications between the child node (e.g., IAB relay nodes 215) or DU 245 of a parent node (e.g., IAB relay node 215) that is performing measurements.

The MT 240 of each of the child nodes (e.g., IAB relay nodes 215) and the parent nodes (e.g., IAB relay nodes 215) may perform beam sweeping in a number of directions when configured to perform uplink beam sweeping as part of a periodic resource set. In some cases, one of the child node (e.g., IAB relay nodes 215) or the parent node (e.g., IAB relay node 215) in a parent-child relationship may differentiate between SRS resource sets to be used for beam management or interference measurement. In some examples, the MT 240 may indicate support for, or a desire to use, SRS for interference measurement. In such cases, such interference measurement may include beam sweeping along directions other than the directions used for uplink or downlink transmissions and the indication from the MT 240 may be semi-static or dynamic. In some cases, one of the grandparent node (e.g., the IAB donor node 210-a) or the DU 245 of one of the parent nodes (e.g., IAB relay nodes 215) may indicate support for, or a desire to use, SRS for interference measurement. In such examples, the indication may be semi-static or dynamic.

In some examples, one or more periodic resources (or periodic resource sets) may be configured by a portion of the wireless communications system 300 for usage for interference measurement. Additionally, a one or more separate periodic resource sets may be configured by a portion of the wireless communications system 300 for beam management. In such cases, the periodic resource set(s) configured for interference measurement may have a different configuration than the periodic resource set(s) configured for beam management. Additionally, in an example of two different periodic resource sets, the two periodic resource sets may have different configurations with respect to a number of resources in each of the two periodic resource sets, a time or frequency location of the two periodic resource sets, or periodicity of each of the two periodic resource sets, among other configurations.

In some examples, the MT 240 of transmitting parent or child node (e.g., IAB relay nodes 215) may select transmission beams to sweep along all configured directions associated with the parent or child node (e.g., IAB relay nodes 215). In some examples, the MT 240 may use a codebook specific to uplink beam sweeping for interference measurement, which may be a different codebook than what may be used by the MT 240 for other types of communications. In one example, the codebook used by the MT 240 for uplink beam sweeping may indicate using a smaller number of beams (e.g., a smaller number of wider beams) to cover a predetermined angular region, as compared to a number of beams (e.g., a larger number of narrower beams) used to perform a non-uplink beam sweeping action by the MT 240. For example, the codebook used by the MT 240 for uplink beam sweeping may indicate using wider beams to cover the predetermined angular region, as compared to the width of the beams used to perform the non-uplink beam sweeping action by the MT 240. In such examples, the number and size (e.g., width) of the beams indicated by the interference measurement codebook for use by the MT 240 may be similar to the beams used by a collocated DU 245 for downlink synchronization signal block (SSB) beam sweeping.

In one example, as part of interference measurement beam sweeping according to the interference measurement codebook, the MT 240 may perform beam sweeping along directions where the MT 240 is configured to communicate (e.g., in a direction associated with camped child nodes (e.g., IAB relay nodes 215) or additional parent nodes (e.g., IAB relay nodes 215)). In some examples, the MT 240 may perform beam sweeping along directions associated with backhaul links, but not along directions associated with access links, according to the interference measurement codebook associated with the MT 240. In such cases, the backhaul links may be a indicated by the interference measurement codebook due to an additional generation of static or other types of interference as compared to the access links.

In some examples, an MT 240 or a collocated DU 245 of one of the parent or child nodes (e.g., IAB relay nodes 215) may indicate a number of beams or SRS resources to perform interference measurement beam sweeping. In such cases, this indication many be semi-static or dynamic. In another example, a DU 245 of one of a parent node (e.g., IAB relay node 215) or the grandparent node (e.g., the IAB donor node 210-a) may determine a number of resources to allocate for interference measurement. In such cases, the determination of the number of resources to allocate for interference measurement may be based on knowledge of the number and type of connections associated with the node associated with the DU 245. For example, the determination of the number of resources to allocate for interference measurement may be based on knowledge of a number of parent or child nodes (e.g., IAB relay nodes 215) connected to the node associated with the determining DU 245.

In some examples, a DU 245 associated with a parent node (e.g., IAB relay node 215) may employ configured uplink SRS transmissions for interference measurements. In such cases, the DU 245 may measure an SRS via one or more reception beams associated with one or more beam directions associated with other communications of the DU 245. In some cases, a CU 250 of a parent node (e.g., IAB relay node 215) may indicate to a DU 245 associated with the parent node (e.g., IAB relay node 215) that the DU 245 may use an SRS resource for interference measurement. In such cases, the CU 250 may indicate specific reception beam directions to be used for interference measurement. In other examples, the DU 245 may provide an interference measurement report to the CU 250 or to the parent node (e.g., IAB relay node 215). Additionally, a parent or child node (e.g., IAB relay nodes 215) may utilize the resources associated with a separate parent or child node (e.g., IAB relay nodes 215) for interference measurement and may be configured by the CU 250 or the DU 245 associated with the resources being utilized.

Figure 4:
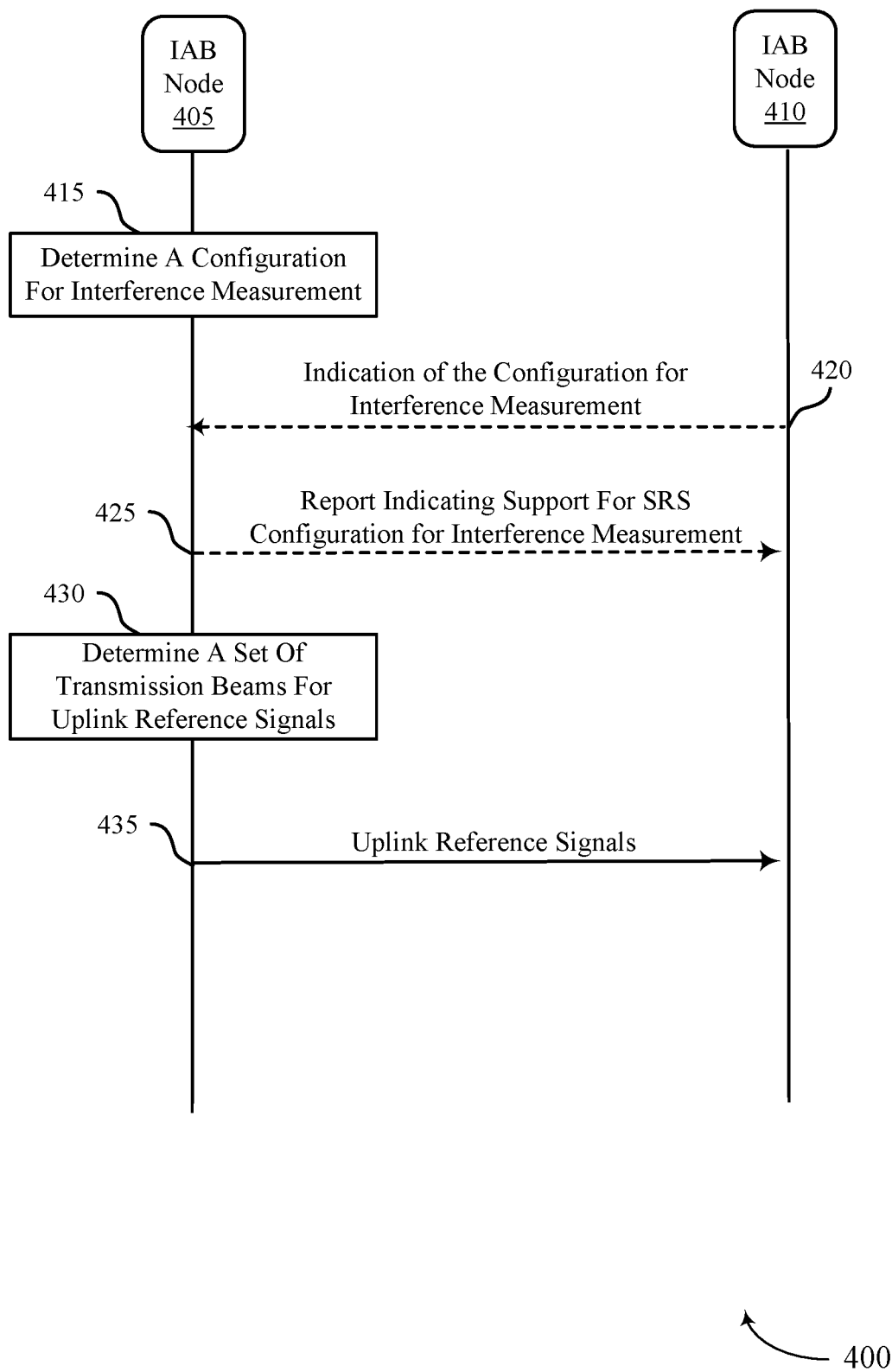
FIG. 4 illustrates an example of a process flow that supports interference measurement configurations in wireless systems in accordance with aspects of the present disclosure.

FIG. 4 illustrates an example of a process flow 400 that supports interference measurement configurations in wireless systems in accordance with aspects of the present disclosure. In some examples, the process flow 400 may implement aspects of wireless communications system 100, wireless communications system 200, or wireless communications system 300. The process flow 400 includes at least an IAB node 405 (e.g., a first wireless node) and an IAB node 410 (e.g., a second wireless node). These may be examples of the corresponding devices described with reference to FIGS. 1 through 3. In some cases, the IAB node 405 and the IAB node 410 may be in a parent-child relationship (e.g., based on establishment of a communications link the IAB node 405 and the IAB node 410, for example, a communication link 125, wireless backhaul link 225, or an access link 311 described with reference to FIGS. 1 through 3). Alternative examples of the following may be implemented, where some steps are performed in a different order than described or at not performed at all. In some cases, steps may include additional features not mentioned below or further steps may be added.

At 415, the IAB node 405 may determine a configuration for interference measurement for the IAB node 405. The configuration may indicate a set of uplink resources for uplink reference signals used for interference measurements and a beam sweeping configuration for transmission of the uplink reference signals. In some cases, the configuration may indicate one or more resource sets that are configured for interference measurement for the IAB node 405. In such cases, the one or more resource sets may be different from the resource sets configured for beam management for the IAB node 405. In some cases, the IAB node 405 may identify a codebook for interference measurement based on the beam sweeping configuration. In such cases, the codebook may be different from codebooks for other communications by the IAB node 405.

Optionally, at 420, the IAB node 405 may receive an indication of the configuration for interference measurement from the IAB node 410. In some cases, the indication of the configuration may be received semi-statically or dynamically. In some cases, the indication may specify an SRS configuration for interference measurement that is different from an SRS configuration for beam management. In some cases, the IAB node 405 may receive the configuration for interference measurement for the IAB node 405. In such cases, the configuration may indicate a resource allocation for SRS resources indicating one or more consecutive symbols within a slot for transmitting the uplink reference signals.

In some cases, the IAB node 405 may receive an uplink reference signal configuration for an additional IAB node different from the IAB node 410. In such cases, the IAB node 405 may monitor for one or more uplink reference signals from the additional IAB node based on the uplink reference signal configuration. The IAB node 405 may perform interference measurement of the additional IAB node based on the one or more uplink reference signals. Additionally, in such cases, the uplink reference signal configuration for the additional IAB node may be received from the IAB node 410 or the additional IAB node.

Optionally, at 425, the IAB node 405 may transmit a report indicating that the IAB node 405 supports using an SRS configuration for interference measurement for the IAB node 405. In some cases, the report may be transmitted semi-statically or dynamically.

At 430, the IAB node 405 may determine a set of transmission beams for the uplink reference signals based on the beam sweeping configuration. In some cases, the IAB node 405 may determine the set of transmission beams to be all transmission beams supported by the UE.

At 435, the IAB node 405 may transmit, to the IAB node 410, the uplink reference signals via the set of uplink resources and the set of transmission beams in accordance with the beam sweeping configuration. In some cases, the IAB node 405 may transmit the uplink reference signals via all the transmission beams supported by the IAB node 405 or the IAB node 410.

In some cases, the IAB node 405 may transmit an indication of a number of transmission beams for beam sweeping via the uplink set of uplink resources using the set of transmission beams. In such cases, the IAB node 405 may receive, in response to the indication, the configuration for interference measurement. The configuration may allocate resources for interference measurement based on the number of transmission beams. Additionally, in such cases, the indication of the number of transmission beams for beam sweeping may be transmitted semi-statically or dynamically.

In some cases, the IAB node 405 may determine a direction of communication for the IAB node 405 and may determine the set of transmission beams based on the direction of communication. In such cases, the IAB node 405 may transmit the uplink reference signals using the set of transmission beams in the direction of communication. In other such cases, the direction of communication may be associated with one or more parent nodes or one or more child nodes associated with the IAB node 405. Further, in such cases, the direction of communication may be associated with one or more backhaul links of the IAB node 405.

Figure 5:
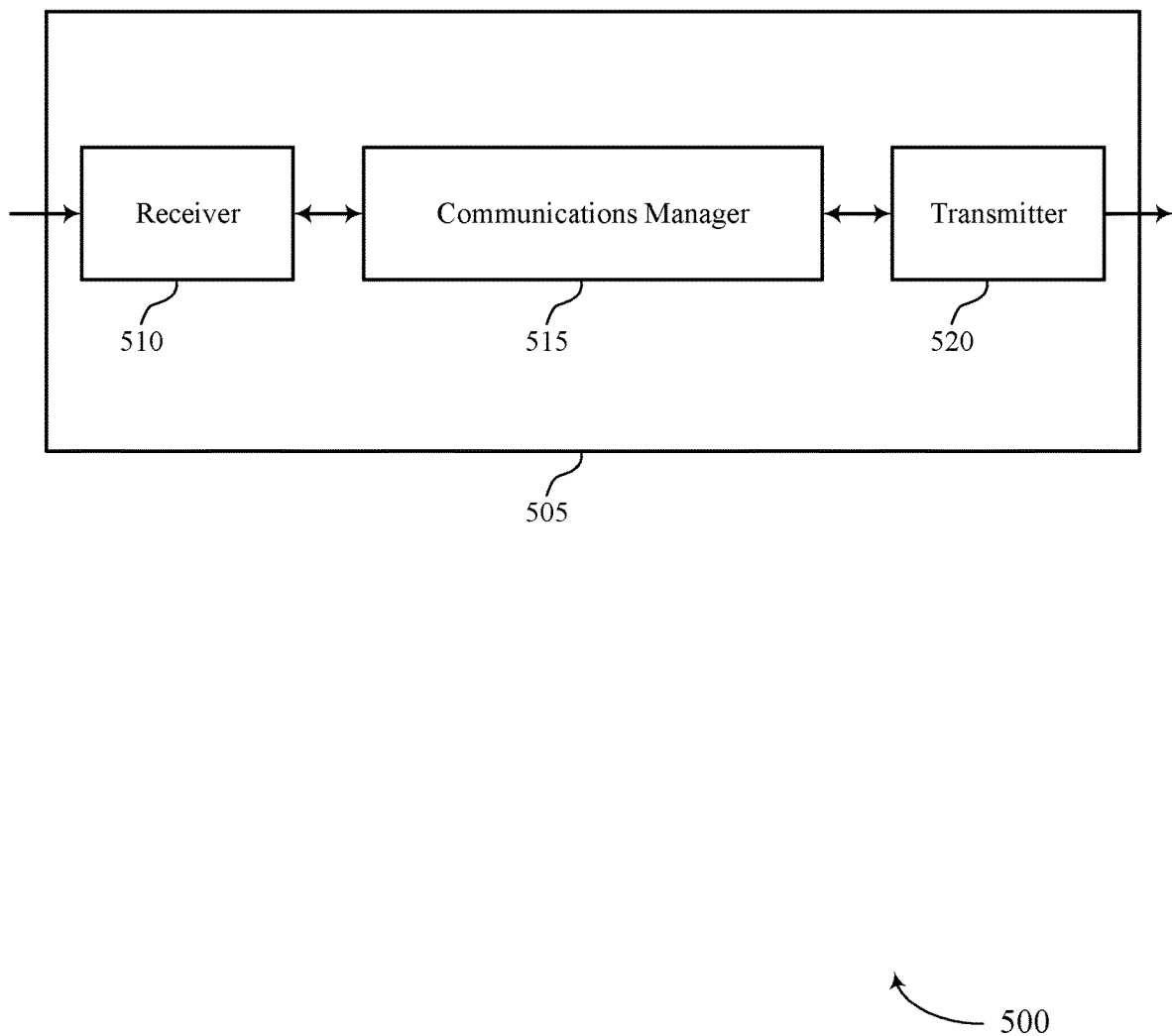
FIGS. 5 and 6 show block diagrams of devices that support interference measurement configurations in wireless systems in accordance with aspects of the present disclosure.

FIG. 5 shows a block diagram 500 of a device 505 that supports interference measurement configurations in wireless systems in accordance with aspects of the present disclosure. The device 505 may be an example of aspects of a UE 115 or base station 105 as described herein. The device 505 may include a receiver 510, a communications manager 515, and a transmitter 520. The device 505 may also include a processor. Each of these components may be in communication with one another (e.g., via one or more buses).

Receiver 510 may receive information such as packets, user data, or control information associated with various information channels (e.g., control channels, data channels, and information related to interference measurement configurations in wireless systems, etc.). Information may be passed on to other components of the device 505. The receiver 510 may be an example of aspects of the transceiver 820 or 920 as described with reference to FIGS. 8 and 9. The receiver 510 may utilize a single antenna or a set of antennas.

The communications manager 515 may determine a configuration for interference measurement for the first wireless node, the configuration indicating a set of uplink resources for uplink reference signals used for interference measurements and a beam sweeping configuration for transmission of the uplink reference signals, determine a set of transmission beams for the uplink reference signals based on the beam sweeping configuration, and transmit, to a second wireless node in the wireless communications system, the uplink reference signals via the set of uplink resources and the set of transmission beams in accordance with the beam sweeping configuration. The communications manager 515 may also identify a configuration for interference measurement for the first wireless node, the configuration indicating a set of uplink resources configured for a second wireless node and a beam sweeping configuration for the second wireless node, monitor, via a set of reception beams, the set of uplink resources configured for a set of uplink reference signals from the second wireless node in accordance with the beam sweeping configuration, and perform an interference measurement on the set of uplink reference signals based on the monitoring. The communications manager 515 may be an example of aspects of the communications manager 810 or 910 as described herein.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

Transmitter 520 may transmit signals generated by other components of the device 505. In some examples, the transmitter 520 may be collocated with a receiver 510 in a transceiver module. For example, the transmitter 520 may be an example of aspects of the transceiver 820 or 920 as described with reference to FIGS. 8 and 9. The transmitter 520 may utilize a single antenna or a set of antennas.

In some examples, the communications manager 515 may be implemented as an integrated circuit or chipset for a mobile device modem, and the receiver 510 and transmitter 520 may be implemented as analog components (e.g., amplifiers, filters, antennas) coupled with the mobile device modem to enable wireless transmission and reception over one or more bands.

The communications manager 515 as described herein may be implemented to realize one or more potential advantages. One implementation may allow the device 505 to determine transmission beams for uplink reference signals based on a configuration, which may reduce or mitigate interference caused by neighboring nodes in a wireless communications system (e.g., an IAB system). Such techniques may allow for more efficient communications, reduced interference, and increased system performance.

Based on techniques for implementing retuning from one narrowband carrier to another as described herein, a processor of a UE 115 (e.g., controlling the receiver 510, the transmitter 520, or the transceiver 820 as described with reference to FIG. 8) may increase reliability and decrease signaling overhead as the UE 115 may avoid performing unnecessary measurements for interference management.

Figure 6:
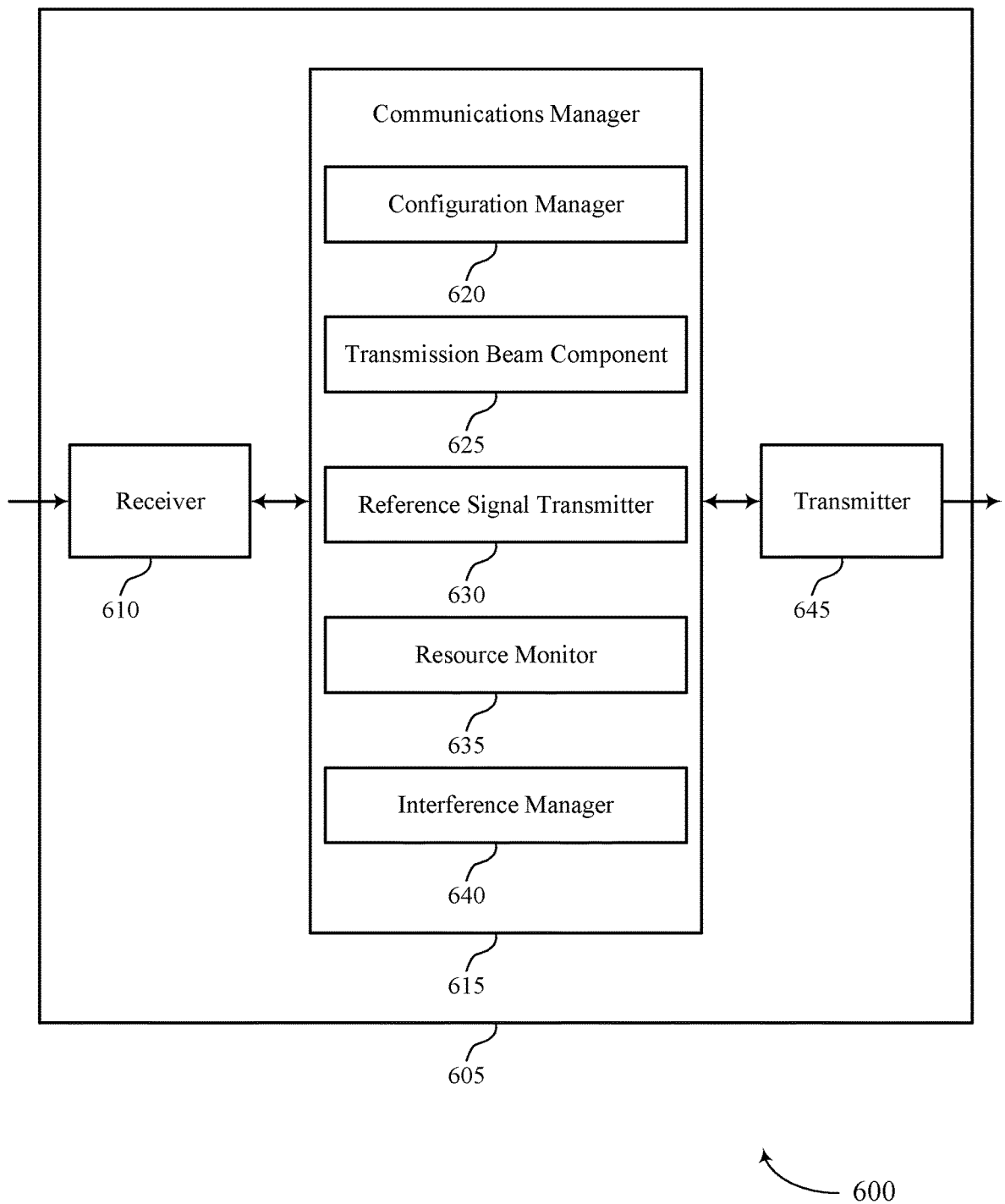

FIG. 6 shows a block diagram 600 of a device 605 that supports interference measurement configurations in wireless systems in accordance with aspects of the present disclosure. The device 605 may be an example of aspects of a device 505, a UE 115, or a base station 105 as described herein. The device 605 may include a receiver 610, a communications manager 615, and a transmitter 645. The device 605 may also include a processor. Each of these components may be in communication with one another (e.g., via one or more buses).

Receiver 610 may receive information such as packets, user data, or control information associated with various information channels (e.g., control channels, data channels, and information related to interference measurement configurations in wireless systems, etc.). Information may be passed on to other components of the device 605. The receiver 610 may be an example of aspects of the transceiver 820 or 920 as described with reference to FIGS. 8 and 9. The receiver 610 may utilize a single antenna or a set of antennas.

The communications manager 615 may be an example of aspects of the communications manager 515 as described herein. The communications manager 615 may include a configuration manager 620, a transmission beam component 625, a reference signal transmitter 630, a resource monitor 635, and an interference manager 640. The communications manager 615 may be an example of aspects of the communications manager 810 or 910 as described herein.

The configuration manager 620 may determine a configuration for interference measurement for the first wireless node, the configuration indicating a set of uplink resources for uplink reference signals used for interference measurements and a beam sweeping configuration for transmission of the uplink reference signals. The transmission beam component 625 may determine a set of transmission beams for the uplink reference signals based on the beam sweeping configuration. The reference signal transmitter 630 may transmit, to a second wireless node in the wireless communications system, the uplink reference signals via the set of uplink resources and the set of transmission beams in accordance with the beam sweeping configuration. The configuration manager 620 may identify a configuration for interference measurement for the first wireless node, the configuration indicating a set of uplink resources configured for a second wireless node and a beam sweeping configuration for the second wireless node.

The resource monitor 635 may monitor, via a set of reception beams, the set of uplink resources configured for a set of uplink reference signals from the second wireless node in accordance with the beam sweeping configuration. The interference manager 640 may perform an interference measurement on the set of uplink reference signals based on the monitoring. Transmitter 645 may transmit signals generated by other components of the device 605. In some examples, the transmitter 645 may be collocated with a receiver 610 in a transceiver module. For example, the transmitter 645 may be an example of aspects of the transceiver 820 or 920 as described with reference to FIGS. 8 and 9. The transmitter 645 may utilize a single antenna or a set of antennas.

Figure 7:
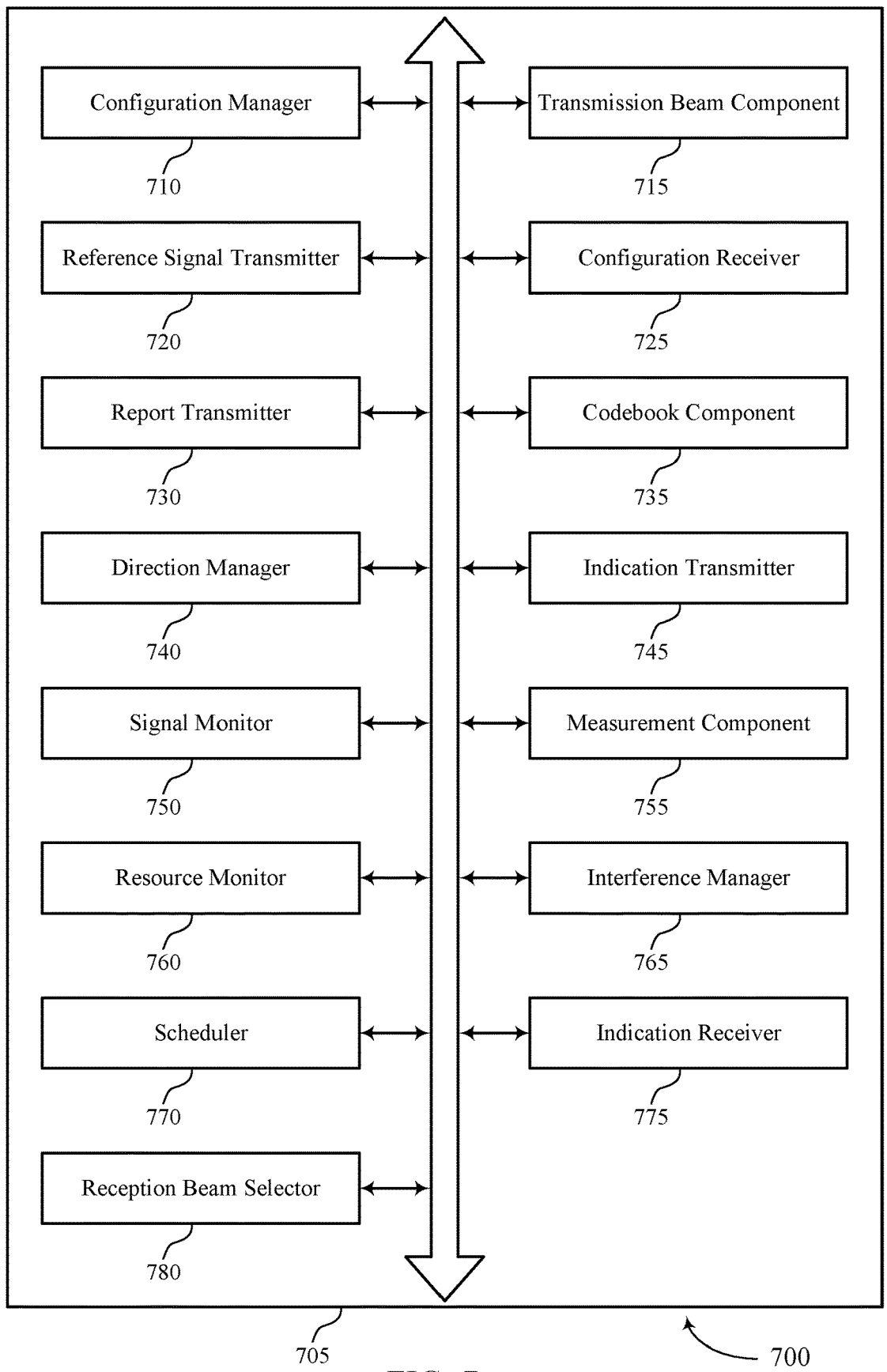
FIG. 7 shows a block diagram of a communications manager that supports interference measurement configurations in wireless systems in accordance with aspects of the present disclosure.

FIG. 7 shows a block diagram 700 of a communications manager 705 that supports interference measurement configurations in wireless systems in accordance with aspects of the present disclosure. The communications manager 705 may be an example of aspects of a communications manager 515, a communications manager 615, or a communications manager 810 described herein. The communications manager 705 may include a configuration manager 710, a transmission beam component 715, a reference signal transmitter 720, a configuration receiver 725, a report transmitter 730, a codebook component 735, a direction manager 740, an indication transmitter 745, a signal monitor 750, a measurement component 755, a resource monitor 760, an interference manager 765, a scheduler 770, an indication receiver 775, and a reception beam selector 780. Each of these modules may communicate, directly or indirectly, with one another (e.g., via one or more buses).

The configuration manager 710 may determine a configuration for interference measurement for the first wireless node, the configuration indicating a set of uplink resources for uplink reference signals used for interference measurements and a beam sweeping configuration for transmission of the uplink reference signals. In some examples, the configuration manager 710 may identify a configuration for interference measurement for the first wireless node, the configuration indicating a set of uplink resources configured for a second wireless node and a beam sweeping configuration for the second wireless node. In some cases, the configuration indicates one or more resource sets configured for interference measurement for the first wireless node, the one or more resource sets different from resource sets configured for beam management for the first wireless node. In some cases, the configuration indicates a transmission power associated with the set of uplink reference signals.

The transmission beam component 715 may determine a set of transmission beams for the uplink reference signals based on the beam sweeping configuration. In some examples, the transmission beam component 715 may determine the set of transmission beams to be all transmission beams supported by the first wireless node. In some examples, the transmission beam component 715 may determine the set of transmission beams based on the direction.

The reference signal transmitter 720 may transmit, to a second wireless node in the wireless communications system, the uplink reference signals via the set of uplink resources and the set of transmission beams in accordance with the beam sweeping configuration. In some examples, the reference signal transmitter 720 may transmit the uplink reference signals via all the transmission beams supported by the first wireless node. In some examples, the reference signal transmitter 720 may transmit the uplink reference signals using the set of transmission beams in the direction of communication. In some cases, the first wireless node and the second wireless node are in a parent-child relationship.

The resource monitor 760 may monitor, via a set of reception beams, the set of uplink resources configured for a set of uplink reference signals from the second wireless node in accordance with the beam sweeping configuration. In some cases, the set of uplink reference signals includes one or more SRSs. The interference manager 765 may perform an interference measurement on the set of uplink reference signals based on the monitoring. The configuration receiver 725 may receive, from the second wireless node or another wireless node in the wireless communications system, an indication of the configuration for interference measurement.

In some examples, the configuration receiver 725 may receive, in response to the indication, the configuration for interference measurement, the configuration allocating resources for interference measurement based on the number of transmission beams. In some examples, the configuration receiver 725 may receive the configuration for interference measurement for the first wireless node, the configuration indicating a resource allocation for SRS resources, the resource allocation indicating one or more consecutive symbols within a slot for transmitting the uplink reference signals. In some examples, the configuration receiver 725 may receive an uplink reference signal configuration for a third wireless node in the wireless communications system. In some cases, the configuration is received semi-statically or dynamically. In some cases, the indication specifies a SRS configuration for interference measurement different from an SRS configuration for beam management.

In some cases, the uplink reference signal configuration for the third wireless node is received from the second wireless node or the third wireless node. The report transmitter 730 may transmit a report indicating that the first wireless node supports using a SRS configuration for interference measurement for the first wireless node. In some examples, the report transmitter 730 may transmit, to at least one of the second wireless node or a central unit, a report indicating a result of the interference measurement. In some cases, the report is transmitted semi-statically or dynamically.

The codebook component 735 may identify a codebook for interference measurement based on the beam sweeping configuration, where the codebook is different from codebooks for other communications by the first wireless node. The direction manager 740 may determine a direction of communication for the first wireless node. In some cases, the direction is associated with one or more parent nodes or one or more child nodes of the first wireless node. In some cases, the direction is associated with one or more backhaul links of the first wireless node. The indication transmitter 745 may transmit an indication of a number of transmission beams for beam sweeping via the uplink the set of uplink resources using the set of transmission beams. In some cases, the indication is transmitted semi-statically or dynamically.

The signal monitor 750 may monitor for one or more uplink reference signals from the third wireless node based on the uplink reference signal configuration. The measurement component 755 may perform interference measurement of the third wireless node based on the one or more uplink reference signals. The scheduler 770 may schedule communications for the first wireless node or a third wireless node based on the interference measurement. The indication receiver 775 may receive, from a central unit, an indication of the configuration for interference measurement for the first wireless node.

The reception beam selector 780 may select the set of reception beams from reception beams supported by the first wireless node based on a communication direction of the first wireless node. In some cases, the communication direction corresponds to a parent node or a child node of the first wireless node, or one or more backhaul links associated with the first wireless node.

Figure 8:
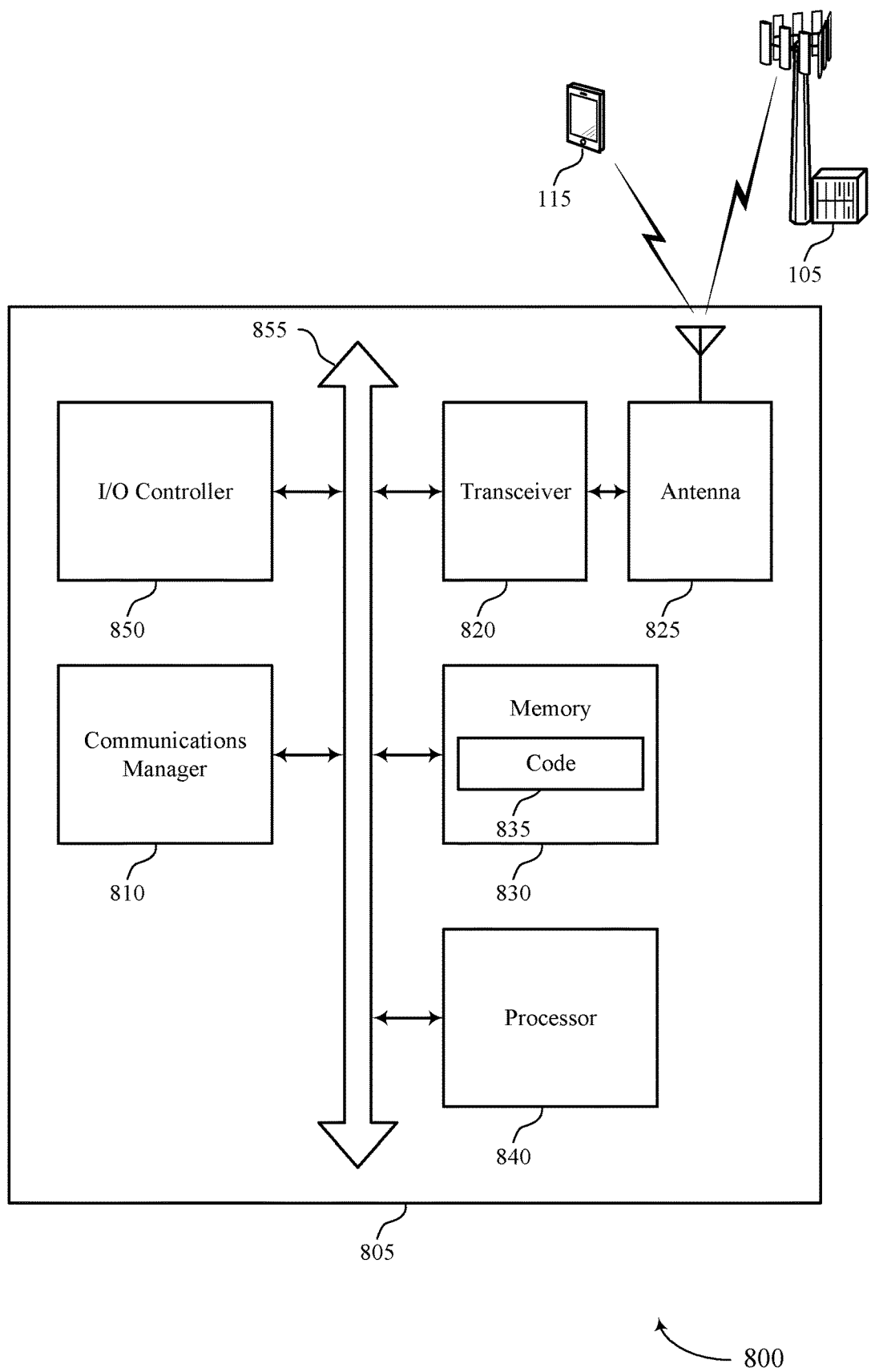
FIG. 8 shows a diagram of a system including a user equipment (UE) that supports interference measurement configurations in wireless systems in accordance with aspects of the present disclosure.

FIG. 8 shows a diagram of a system 800 including a device 805 that supports interference measurement configurations in wireless systems in accordance with aspects of the present disclosure. The device 805 may be an example of or include the components of device 505, device 605, or a UE 115 as described herein. The device 805 may include components for bi-directional voice and data communications including components for transmitting and receiving communications, including a communications manager 810, a transceiver 820, an antenna 825, memory 830, a processor 840, and an I/O controller 850. These components may be in electronic communication via one or more buses (e.g., bus 855).

The communications manager 810 may determine a configuration for interference measurement for the first wireless node, the configuration indicating a set of uplink resources for uplink reference signals used for interference measurements and a beam sweeping configuration for transmission of the uplink reference signals, determine a set of transmission beams for the uplink reference signals based on the beam sweeping configuration, and transmit, to a second wireless node in the wireless communications system, the uplink reference signals via the set of uplink resources and the set of transmission beams in accordance with the beam sweeping configuration. The communications manager 810 may also identify a configuration for interference measurement for the first wireless node, the configuration indicating a set of uplink resources configured for a second wireless node and a beam sweeping configuration for the second wireless node, monitor, via a set of reception beams, the set of uplink resources configured for a set of uplink reference signals from the second wireless node in accordance with the beam sweeping configuration, and perform an interference measurement on the set of uplink reference signals based on the monitoring.

Transceiver 820 may communicate bi-directionally, via one or more antennas, wired, or wireless links as described herein. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include random access memory (RAM), read only memory (ROM), or a combination thereof. The memory 830 may store computer-readable code 835 including instructions that, when executed by a processor (e.g., the processor 840) cause the device to perform various functions described herein. In some cases, the memory 830 may contain, among other things, a basic I/O system (BIOS) which may control basic hardware or software operation such as the interaction with peripheral components or devices.

The processor 840 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting interference measurement configurations in wireless systems).

The I/O controller 850 may manage input and output signals for the device 805. The I/O controller 850 may also manage peripherals not integrated into the device 805. In some cases, the I/O controller 850 may represent a physical connection or port to an external peripheral. In some cases, the I/O controller 850 may utilize an operating system such as iOS®, ANDROID®, MS-DOS®, MS-WINDOWS®, OS/2®, UNIX®, LINUX®, or another known operating system. In other cases, the I/O controller 850 may represent or interact with a modem, a keyboard, a mouse, a touchscreen, or a similar device. In some cases, the I/O controller 850 may be implemented as part of a processor. In some cases, a user may interact with the device 805 via the I/O controller 850 or via hardware components controlled by the I/O controller 850.

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
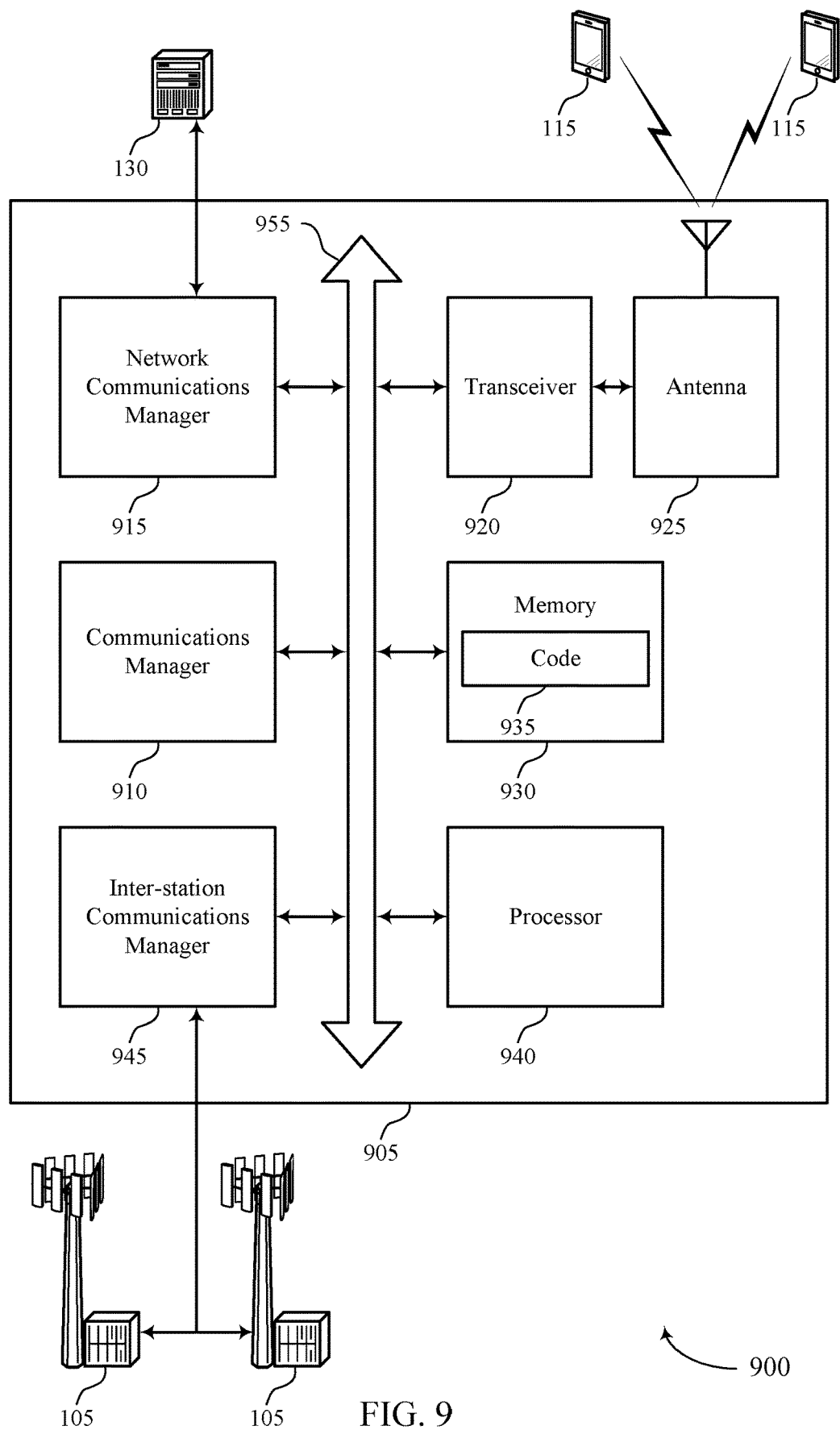
FIG. 9 shows a diagram of a system including a base station that supports interference measurement configurations in wireless systems in accordance with aspects of the present disclosure.

FIG. 9 shows a diagram of a system 900 including a device 905 that supports interference measurement configurations in wireless systems in accordance with aspects of the present disclosure. The device 905 may be an example of or include the components of device 505, device 605, or a base station 105 as described herein. The device 905 may include components for bi-directional voice and data communications including components for transmitting and receiving communications, including a communications manager 910, a network communications manager 915, a transceiver 920, an antenna 925, memory 930, a processor 940, and an inter-station communications manager 945. These components may be in electronic communication via one or more buses (e.g., bus 955).

The communications manager 910 may determine a configuration for interference measurement for the first wireless node, the configuration indicating a set of uplink resources for uplink reference signals used for interference measurements and a beam sweeping configuration for transmission of the uplink reference signals, determine a set of transmission beams for the uplink reference signals based on the beam sweeping configuration, and transmit, to a second wireless node in the wireless communications system, the uplink reference signals via the set of uplink resources and the set of transmission beams in accordance with the beam sweeping configuration. The communications manager 910 may also identify a configuration for interference measurement for the first wireless node, the configuration indicating a set of uplink resources configured for a second wireless node and a beam sweeping configuration for the second wireless node, monitor, via a set of reception beams, the set of uplink resources configured for a set of uplink reference signals from the second wireless node in accordance with the beam sweeping configuration, and perform an interference measurement on the set of uplink reference signals based on the monitoring.

Network communications manager 915 may manage communications with the core network (e.g., via one or more wired backhaul links). For example, the network communications manager 915 may manage the transfer of data communications for client devices, such as one or more UEs 115.

Transceiver 920 may communicate bi-directionally, via one or more antennas, wired, or wireless links as described herein. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include RAM, ROM, or a combination thereof. The memory 930 may store computer-readable code 935 including instructions that, when executed by a processor (e.g., the processor 940) cause the device to perform various functions described herein. In some cases, the memory 930 may contain, among other things, a BIOS which may control basic hardware or software operation such as the interaction with peripheral components or devices.

The processor 940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting interference measurement configurations in wireless systems).

Inter-station communications manager 945 may manage communications with other base station 105, and may include a controller or scheduler for controlling communications with UEs 115 in cooperation with other base stations 105. For example, the inter-station communications manager 945 may coordinate scheduling for transmissions to UEs 115 for various interference mitigation techniques such as beamforming or joint transmission. In some examples, inter-station communications manager 945 may provide an X2 interface within an LTE/LTE-A wireless communication network technology to provide communication between base stations 105.

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
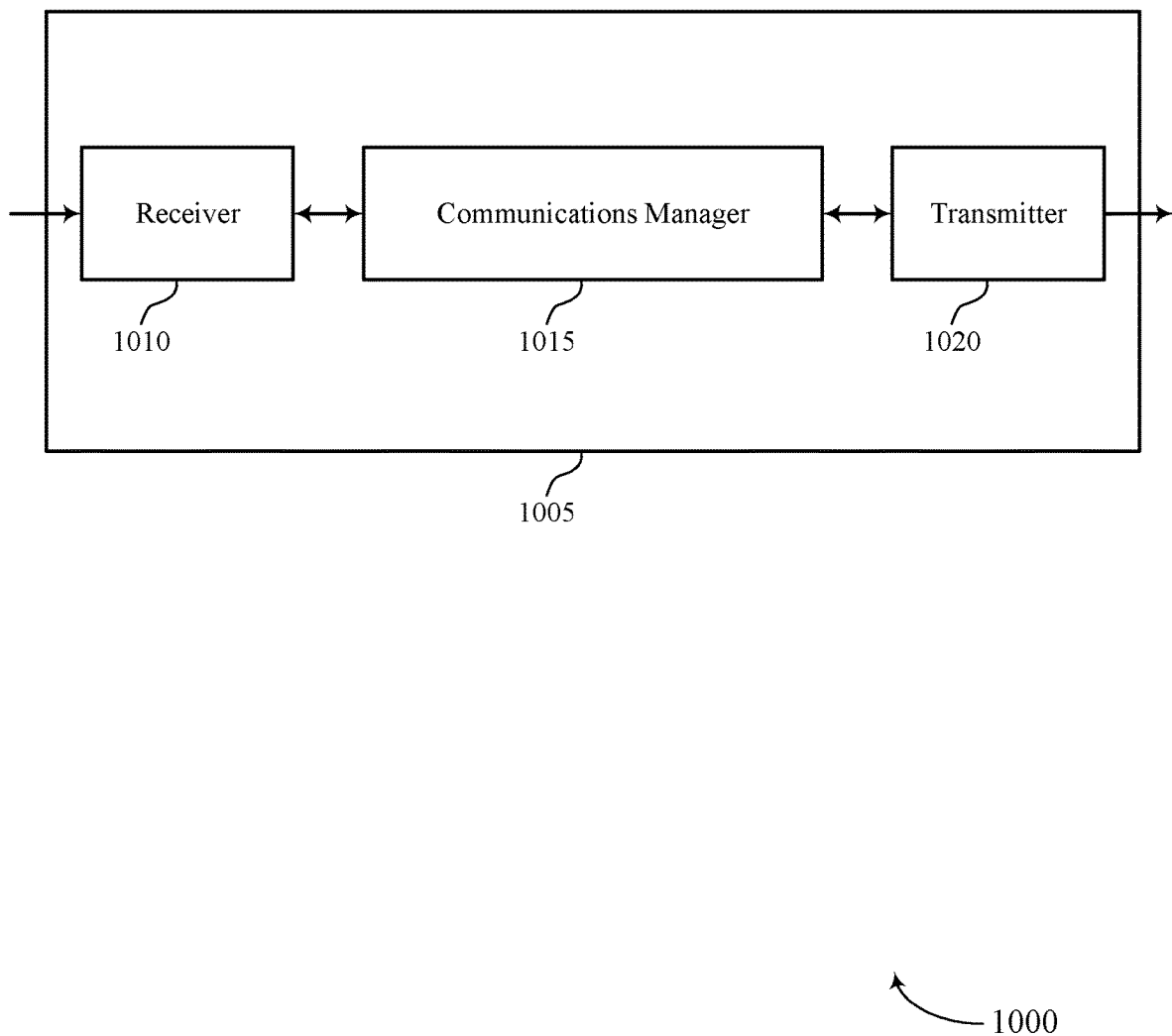
FIGS. 10 and 11 show block diagrams of devices that support interference measurement configurations in wireless systems in accordance with aspects of the present disclosure.

FIG. 10 shows a block diagram 1000 of a device 1005 that supports interference measurement configurations in wireless systems in accordance with aspects of the present disclosure. The device 1005 may be an example of aspects of a base station 105 as described herein. The device 1005 may include a receiver 1010, a communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to interference measurement configurations in wireless systems, etc.). Information may be passed on to other components of the device 1005. The receiver 1010 may be an example of aspects of the transceiver 1320 described with reference to FIG. 13. The receiver 1010 may utilize a single antenna or a set of antennas.

The communications manager 1015 may transmit, to a first wireless node of the wireless communications system, a configuration for interference management, the configuration indicating a set of uplink resources and a beam sweeping configuration for a set of uplink reference signals, receive, from a second wireless node, a report indicating interference measurements in accordance with the configuration, and transmit scheduling information to the first wireless node or the second wireless node based on the report, the scheduling information including a resource allocation for communications for the first wireless node or the second wireless node. The communications manager 1015 may be an example of aspects of the communications manager 1310 described herein.

The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
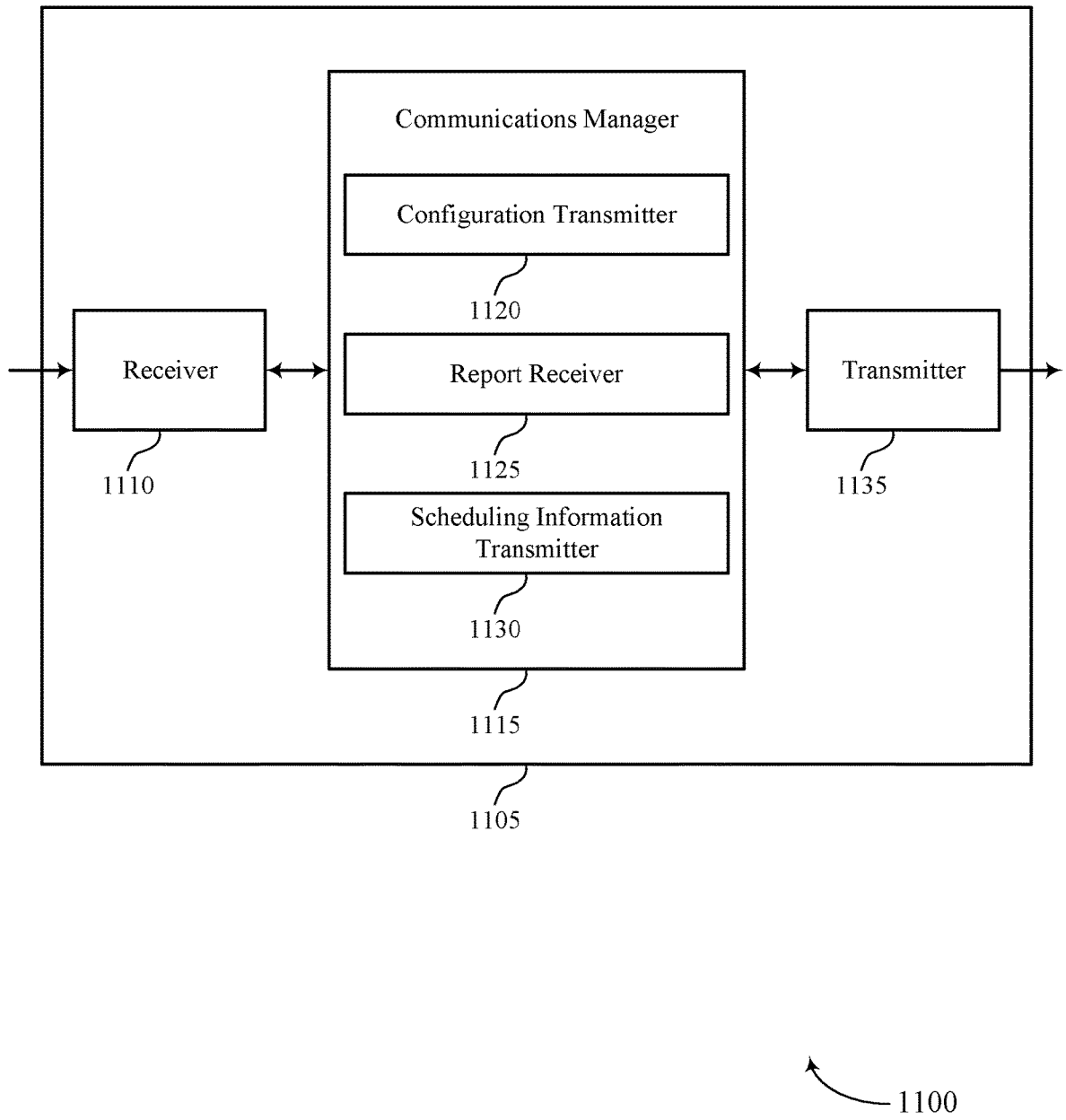

FIG. 11 shows a block diagram 1100 of a device 1105 that supports interference measurement configurations in wireless systems in accordance with aspects of the present disclosure. The device 1105 may be an example of aspects of a device 1005, or a base station 105 as described herein. The device 1105 may include a receiver 1110, a communications manager 1115, and a transmitter 1135. The device 1105 may also include a processor. Each of these components may be in communication with one another (e.g., via one or more buses).

The receiver 1110 may receive information such as packets, user data, or control information associated with various information channels (e.g., control channels, data channels, and information related to interference measurement configurations in wireless systems, etc.). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include a configuration transmitter 1120, a report receiver 1125, and a scheduling information transmitter 1130. The communications manager 1115 may be an example of aspects of the communications manager 1310 described herein.

The configuration transmitter 1120 may transmit, to a first wireless node of the wireless communications system, a configuration for interference management, the configuration indicating a set of uplink resources and a beam sweeping configuration for a set of uplink reference signals. The report receiver 1125 may receive, from a second wireless node, a report indicating interference measurements in accordance with the configuration. The scheduling information transmitter 1130 may transmit scheduling information to the first wireless node or the second wireless node based on the report, the scheduling information including a resource allocation for communications for the first wireless node or the second wireless node.

The transmitter 1135 may transmit signals generated by other components of the device 1105. In some examples, the transmitter 1135 may be collocated with a receiver 1110 in a transceiver module. For example, the transmitter 1135 may be an example of aspects of the transceiver 1320 described with reference to FIG. 13. The transmitter 1135 may utilize a single antenna or a set of antennas.

Figure 12:
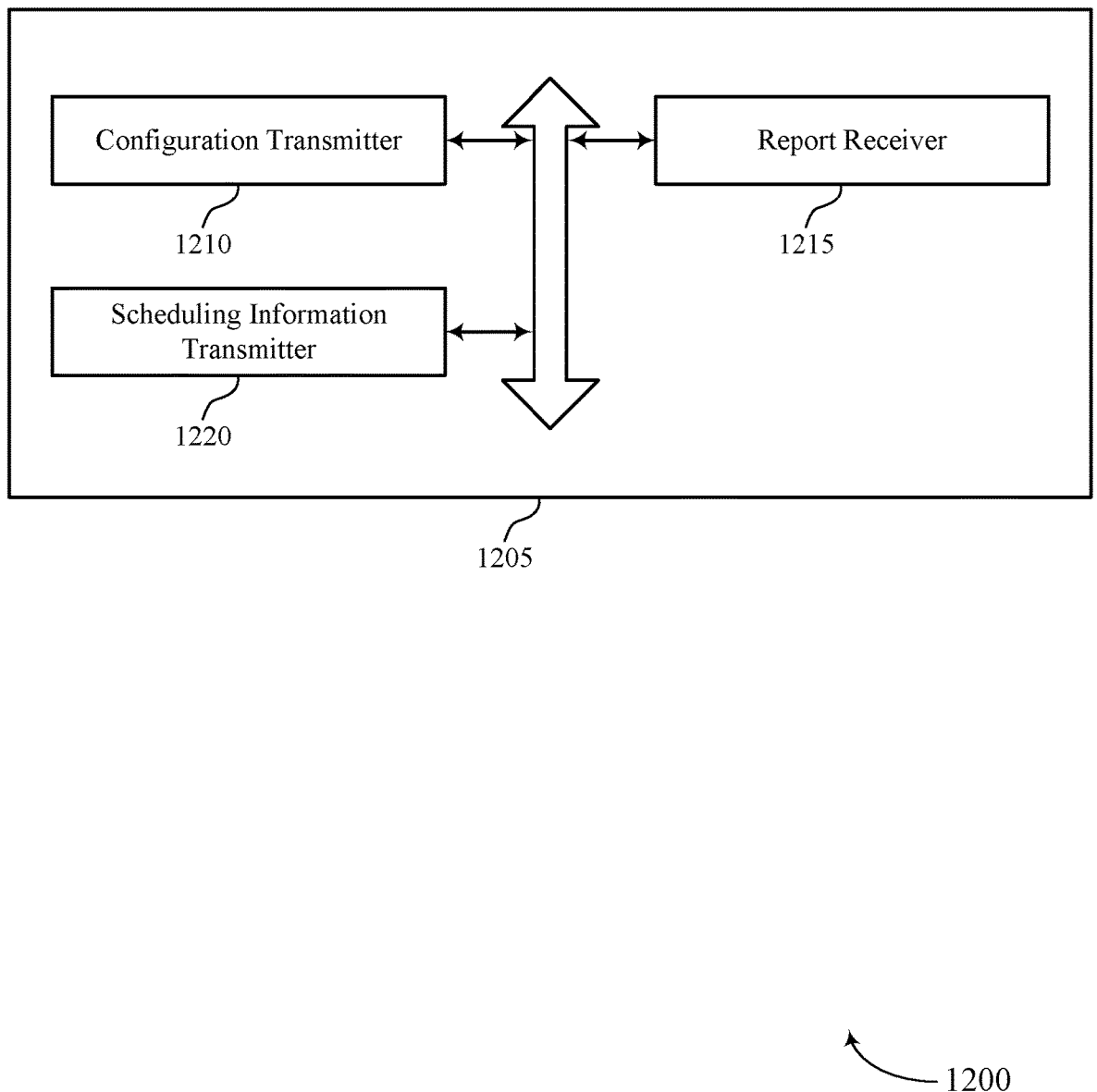
FIG. 12 shows a block diagram of a communications manager that supports interference measurement configurations in wireless systems in accordance with aspects of the present disclosure.

FIG. 12 shows a block diagram 1200 of a communications manager 1205 that supports interference measurement configurations in wireless systems in accordance with aspects of the present disclosure. The communications manager 1205 may be an example of aspects of a communications manager 1015, a communications manager 1115, or a communications manager 1310 described herein. The communications manager 1205 may include a configuration transmitter 1210, a report receiver 1215, and a scheduling information transmitter 1220. Each of these modules may communicate, directly or indirectly, with one another (e.g., via one or more buses).

The configuration transmitter 1210 may transmit, to a first wireless node of the wireless communications system, a configuration for interference management, the configuration indicating a set of uplink resources and a beam sweeping configuration for a set of uplink reference signals. In some cases, the configuration indicates a set of reception beams for the second wireless node to be used for interference measurements. In some cases, the first wireless node is a child or a grandchild of the central unit. In some cases, the configuration indicates a transmission power associated with the set of uplink reference signals. In some cases, the set of uplink reference signals includes one or more SRSs.

The report receiver 1215 may receive, from a second wireless node, a report indicating interference measurements in accordance with the configuration. The scheduling information transmitter 1220 may transmit scheduling information to the first wireless node or the second wireless node based on the report, the scheduling information including a resource allocation for communications for the first wireless node or the second wireless node.

Figure 13:
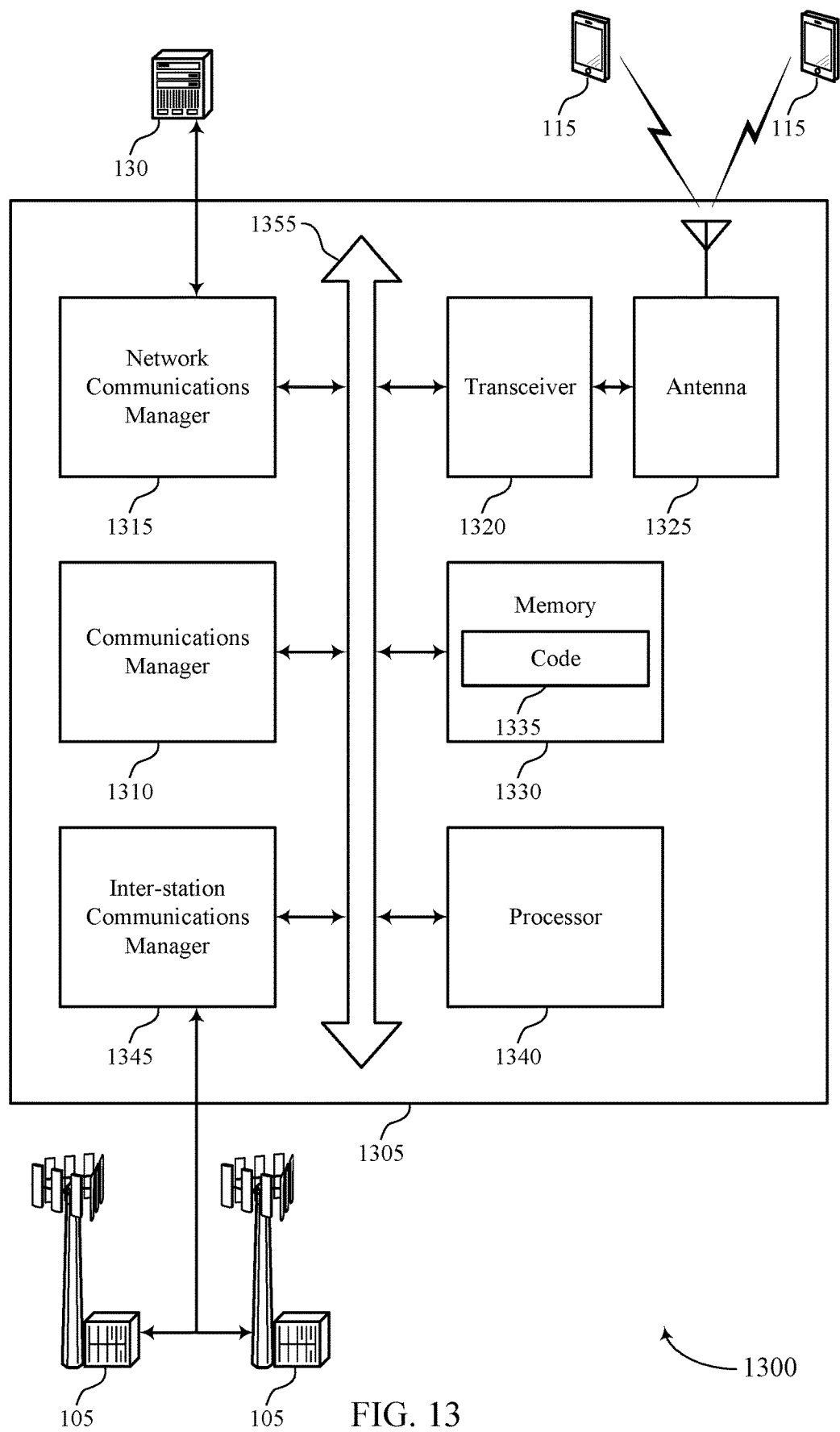
FIG. 13 shows a diagram of a system including a device that supports interference measurement configurations in wireless systems in accordance with aspects of the present disclosure.

FIG. 13 shows a diagram of a system 1300 including a device 1305 that supports interference measurement configurations in wireless systems in accordance with aspects of the present disclosure. The device 1305 may be an example of or include the components of device 1005, device 1105, or a base station 105 as described herein. The device 1305 may include components for bi-directional voice and data communications including components for transmitting and receiving communications, including a communications manager 1310, a network communications manager 1315, a transceiver 1320, an antenna 1325, memory 1330, a processor 1340, and an inter-station communications manager 1345. These components may be in electronic communication via one or more buses (e.g., bus 1355).

The communications manager 1310 may transmit, to a first wireless node of the wireless communications system, a configuration for interference management, the configuration indicating a set of uplink resources and a beam sweeping configuration for a set of uplink reference signals, receive, from a second wireless node, a report indicating interference measurements in accordance with the configuration, and transmit scheduling information to the first wireless node or the second wireless node based on the report, the scheduling information including a resource allocation for communications for the first wireless node or the second wireless node.

The network communications manager 1315 may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described herein. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM, ROM, or a combination thereof. The memory 1330 may store computer-readable code 1335 including instructions that, when executed by a processor (e.g., the processor 1340) cause the device to perform various functions described herein. In some cases, the memory 1330 may contain, among other things, a BIOS which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some cases, a memory controller may be integrated into processor 1340. The processor 1340 may be configured to execute computer-readable instructions stored in a memory (e.g., the memory 1330) to cause the device 1305 to perform various functions (e.g., functions or tasks supporting interference measurement configurations in wireless systems).

The inter-station communications manager 1345 may manage communications with other base station 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
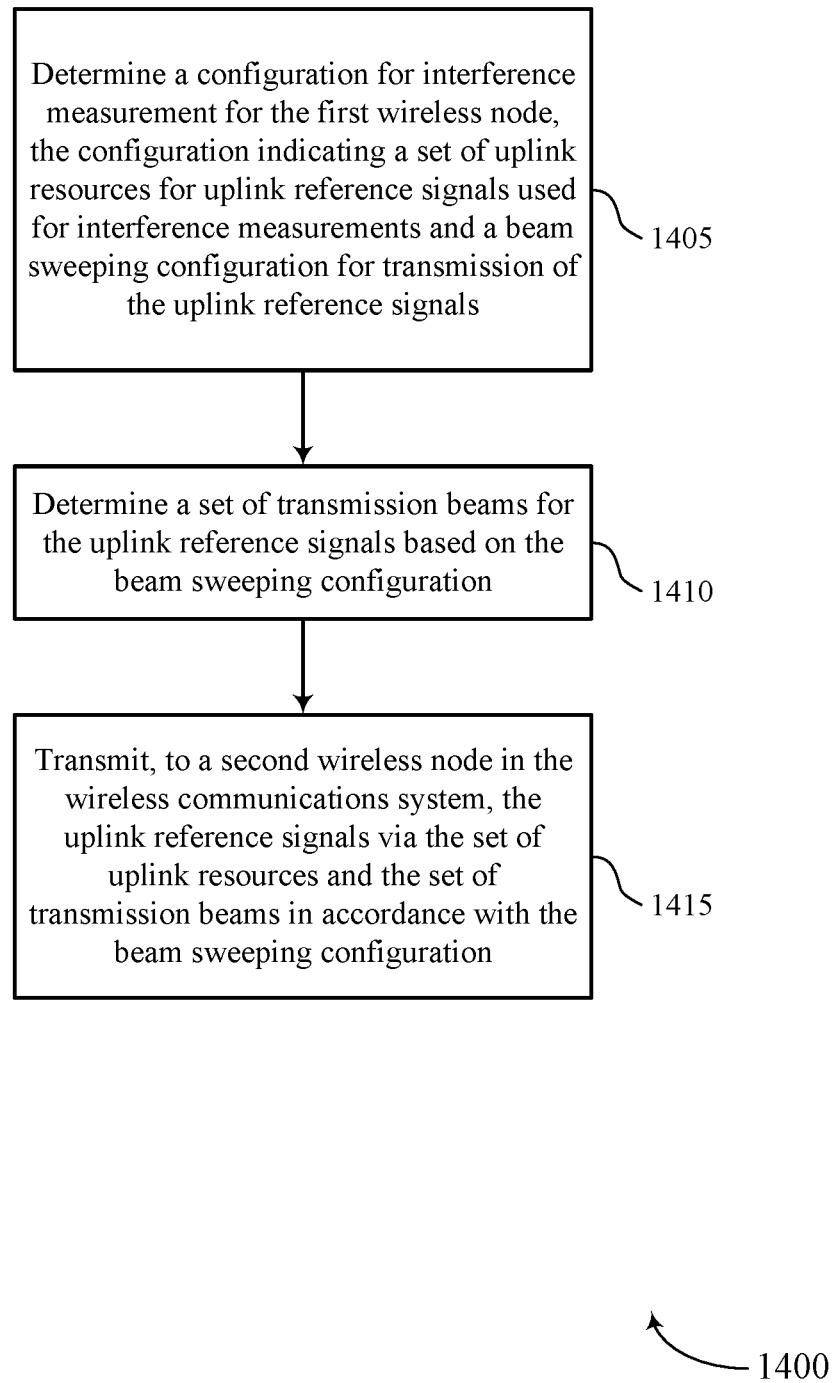
FIGS. 14 through 21 show flowcharts illustrating methods that support interference measurement configurations in wireless systems in accordance with aspects of the present disclosure.

FIG. 14 shows a flowchart illustrating a method 1400 that supports interference measurement configurations in wireless systems in accordance with aspects of the present disclosure. The operations of method 1400 may be implemented by a UE 115 or base station 105 or its components as described herein. For example, the operations of method 1400 may be performed by a communications manager as described with reference to FIGS. 5 through 9. In some examples, a UE or base station may execute a set of instructions to control the functional elements of the UE or base station to perform the functions described herein. Additionally or alternatively, a UE or base station may perform aspects of the functions described herein using special-purpose hardware.

At 1405, the UE or base station may determine a configuration for interference measurement for the first wireless node, the configuration indicating a set of uplink resources for uplink reference signals used for interference measurements and a beam sweeping configuration for transmission of the uplink reference signals. The operations of 1405 may be performed according to the methods described herein. In some examples, aspects of the operations of 1405 may be performed by a configuration manager as described with reference to FIGS. 5 through 9.

At 1410, the UE or base station may determine a set of transmission beams for the uplink reference signals based on the beam sweeping configuration. The operations of 1410 may be performed according to the methods described herein. In some examples, aspects of the operations of 1410 may be performed by a transmission beam component as described with reference to FIGS. 5 through 9.

At 1415, the UE or base station may transmit, to a second wireless node in the wireless communications system, the uplink reference signals via the set of uplink resources and the set of transmission beams in accordance with the beam sweeping configuration. The operations of 1415 may be performed according to the methods described herein. In some examples, aspects of the operations of 1415 may be performed by a reference signal transmitter as described with reference to FIGS. 5 through 9.

Figure 15:
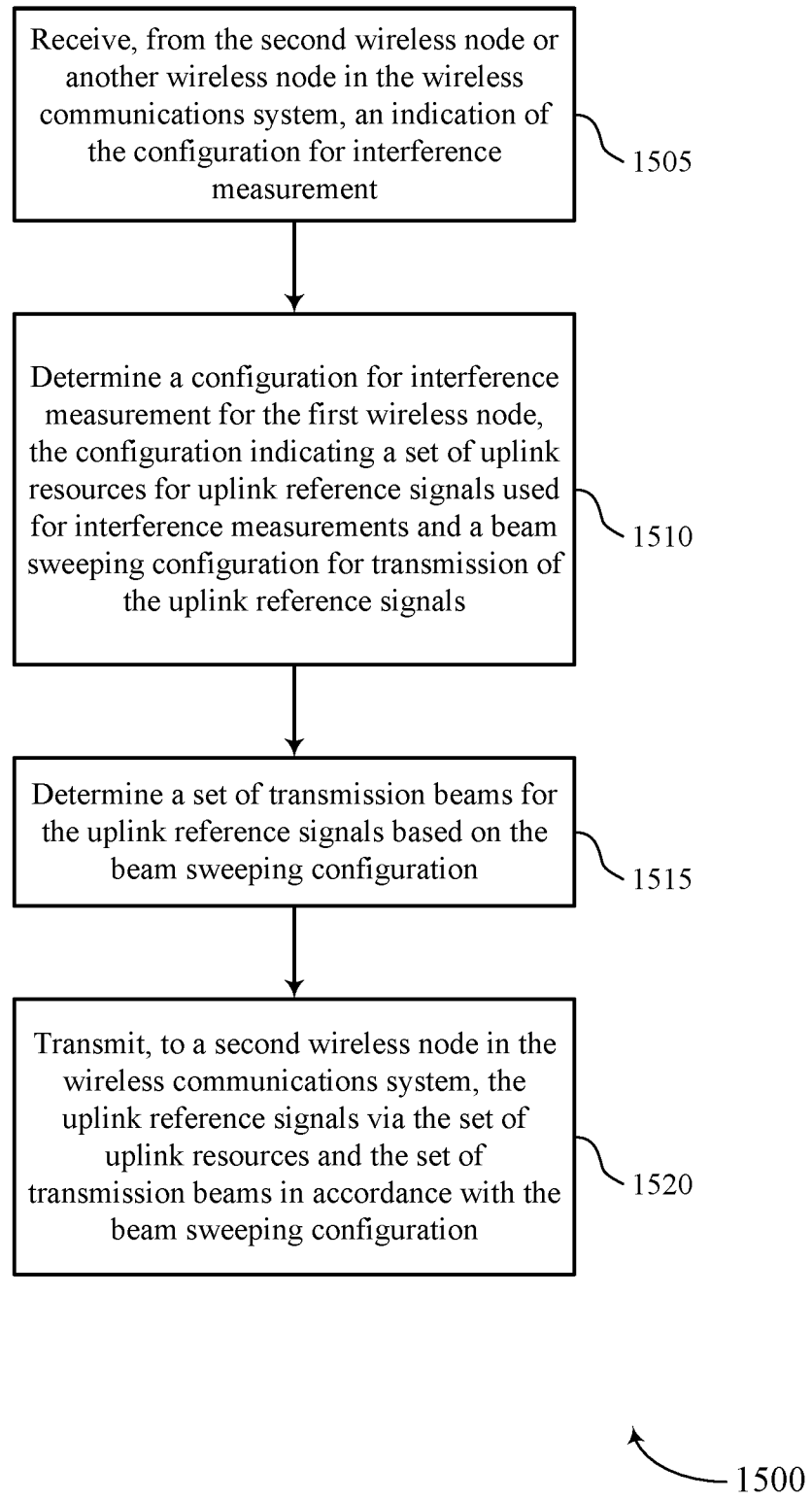

FIG. 15 shows a flowchart illustrating a method 1500 that supports interference measurement configurations in wireless systems in accordance with aspects of the present disclosure. The operations of method 1500 may be implemented by a UE 115 or base station 105 or its components as described herein. For example, the operations of method 1500 may be performed by a communications manager as described with reference to FIGS. 5 through 9. In some examples, a UE or base station may execute a set of instructions to control the functional elements of the UE or base station to perform the functions described herein. Additionally or alternatively, a UE or base station may perform aspects of the functions described herein using special-purpose hardware.

At 1505, the UE or base station may receive, from the second wireless node or another wireless node in the wireless communications system, an indication of the configuration for interference measurement. The operations of 1505 may be performed according to the methods described herein. In some examples, aspects of the operations of 1505 may be performed by a configuration receiver as described with reference to FIGS. 5 through 9.

At 1510, the UE or base station may determine a configuration for interference measurement for the first wireless node, the configuration indicating a set of uplink resources for uplink reference signals used for interference measurements and a beam sweeping configuration for transmission of the uplink reference signals. The operations of 1510 may be performed according to the methods described herein. In some examples, aspects of the operations of 1510 may be performed by a configuration manager as described with reference to FIGS. 5 through 9.

At 1515, the UE or base station may determine a set of transmission beams for the uplink reference signals based on the beam sweeping configuration. The operations of 1515 may be performed according to the methods described herein. In some examples, aspects of the operations of 1515 may be performed by a transmission beam component as described with reference to FIGS. 5 through 9.

At 1520, the UE or base station may transmit, to a second wireless node in the wireless communications system, the uplink reference signals via the set of uplink resources and the set of transmission beams in accordance with the beam sweeping configuration. The operations of 1520 may be performed according to the methods described herein. In some examples, aspects of the operations of 1520 may be performed by a reference signal transmitter as described with reference to FIGS. 5 through 9.

Figure 16:
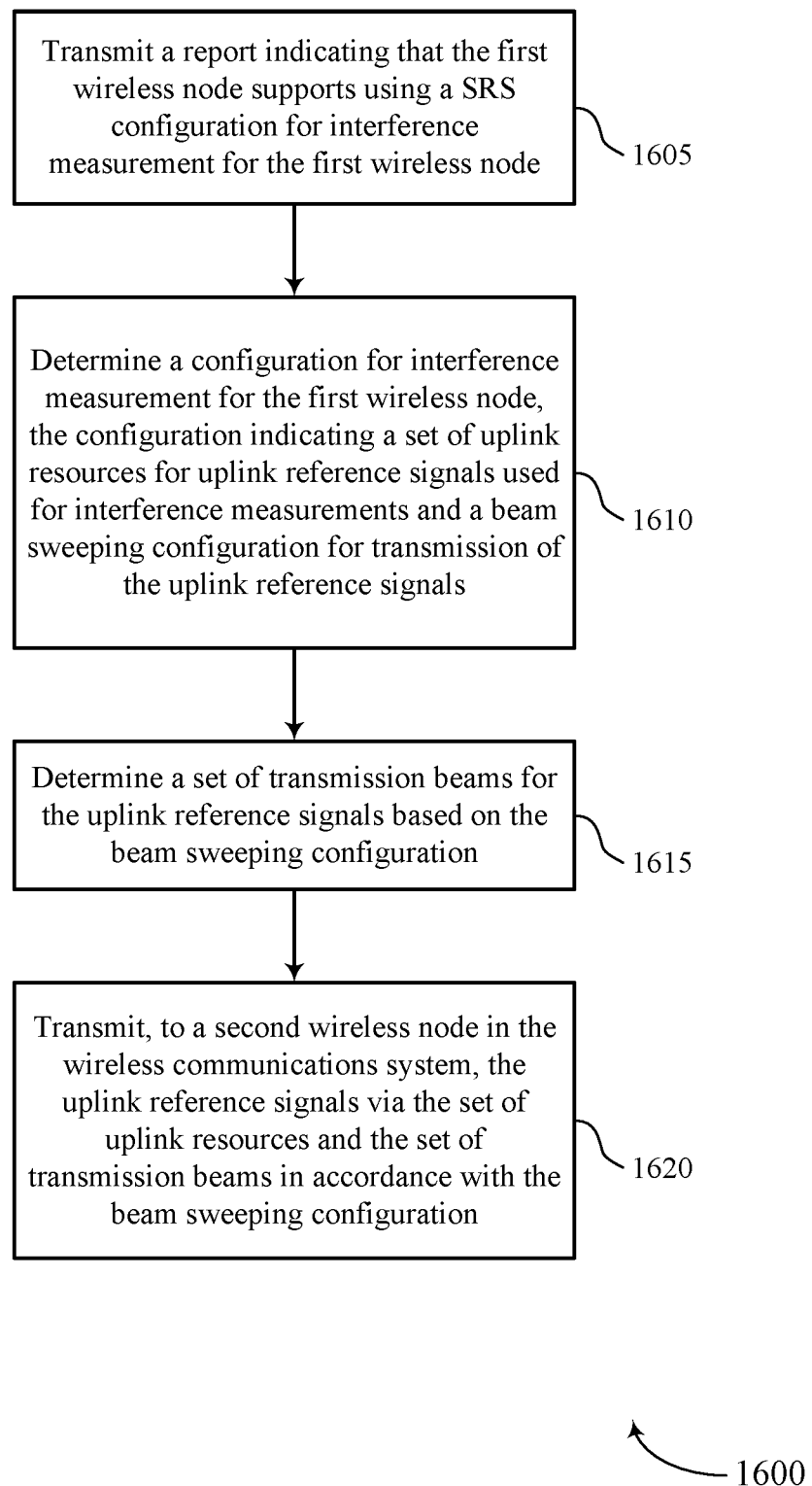

FIG. 16 shows a flowchart illustrating a method 1600 that supports interference measurement configurations in wireless systems in accordance with aspects of the present disclosure. The operations of method 1600 may be implemented by a UE 115 or base station 105 or its components as described herein. For example, the operations of method 1600 may be performed by a communications manager as described with reference to FIGS. 5 through 9. In some examples, a UE or base station may execute a set of instructions to control the functional elements of the UE or base station to perform the functions described herein. Additionally or alternatively, a UE or base station may perform aspects of the functions described herein using special-purpose hardware.

At 1605, the UE or base station may transmit a report indicating that the first wireless node supports using a SRS configuration for interference measurement for the first wireless node. The operations of 1605 may be performed according to the methods described herein. In some examples, aspects of the operations of 1605 may be performed by a report transmitter as described with reference to FIGS. 5 through 9.

At 1610, the UE or base station may determine a configuration for interference measurement for the first wireless node, the configuration indicating a set of uplink resources for uplink reference signals used for interference measurements and a beam sweeping configuration for transmission of the uplink reference signals. The operations of 1610 may be performed according to the methods described herein. In some examples, aspects of the operations of 1610 may be performed by a configuration manager as described with reference to FIGS. 5 through 9.

At 1615, the UE or base station may determine a set of transmission beams for the uplink reference signals based on the beam sweeping configuration. The operations of 1615 may be performed according to the methods described herein. In some examples, aspects of the operations of 1615 may be performed by a transmission beam component as described with reference to FIGS. 5 through 9.

At 1620, the UE or base station may transmit, to a second wireless node in the wireless communications system, the uplink reference signals via the set of uplink resources and the set of transmission beams in accordance with the beam sweeping configuration. The operations of 1620 may be performed according to the methods described herein. In some examples, aspects of the operations of 1620 may be performed by a reference signal transmitter as described with reference to FIGS. 5 through 9.

Figure 17:
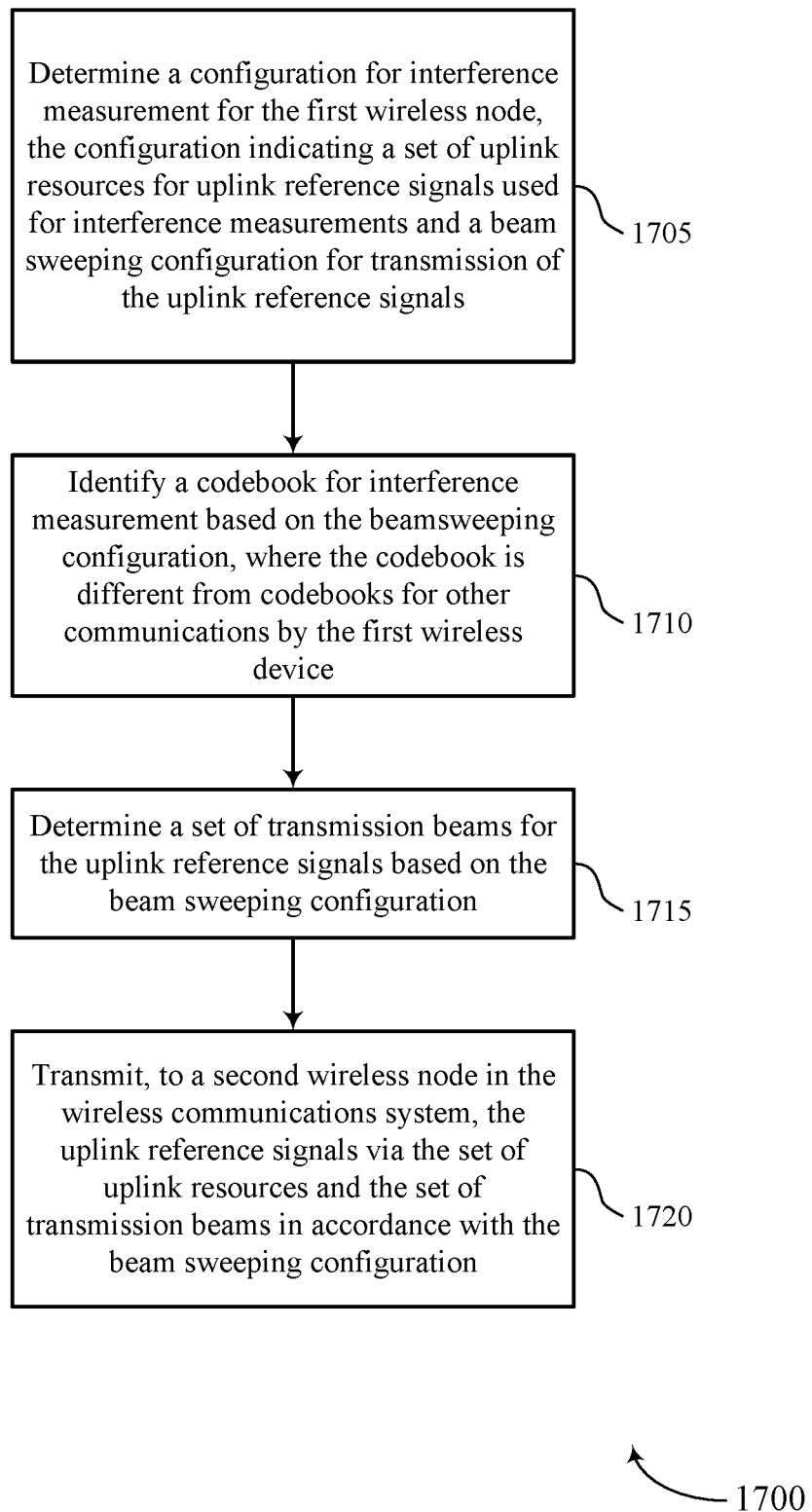

FIG. 17 shows a flowchart illustrating a method 1700 that supports interference measurement configurations in wireless systems in accordance with aspects of the present disclosure. The operations of method 1700 may be implemented by a UE 115 or base station 105 or its components as described herein. For example, the operations of method 1700 may be performed by a communications manager as described with reference to FIGS. 5 through 9. In some examples, a UE or base station may execute a set of instructions to control the functional elements of the UE or base station to perform the functions described herein. Additionally or alternatively, a UE or base station may perform aspects of the functions described herein using special-purpose hardware.

At 1705, the UE or base station may determine a configuration for interference measurement for the first wireless node, the configuration indicating a set of uplink resources for uplink reference signals used for interference measurements and a beam sweeping configuration for transmission of the uplink reference signals. The operations of 1705 may be performed according to the methods described herein. In some examples, aspects of the operations of 1705 may be performed by a configuration manager as described with reference to FIGS. 5 through 9.

At 1710, the UE or base station may identify a codebook for interference measurement based on the beam sweeping configuration, where the codebook is different from codebooks for other communications by the first wireless node. The operations of 1710 may be performed according to the methods described herein. In some examples, aspects of the operations of 1710 may be performed by a codebook component as described with reference to FIGS. 5 through 9.

At 1715, the UE or base station may determine a set of transmission beams for the uplink reference signals based on the beam sweeping configuration. The operations of 1715 may be performed according to the methods described herein. In some examples, aspects of the operations of 1715 may be performed by a transmission beam component as described with reference to FIGS. 5 through 9.

At 1720, the UE or base station may transmit, to a second wireless node in the wireless communications system, the uplink reference signals via the set of uplink resources and the set of transmission beams in accordance with the beam sweeping configuration. The operations of 1720 may be performed according to the methods described herein. In some examples, aspects of the operations of 1720 may be performed by a reference signal transmitter as described with reference to FIGS. 5 through 9.

Figure 18:
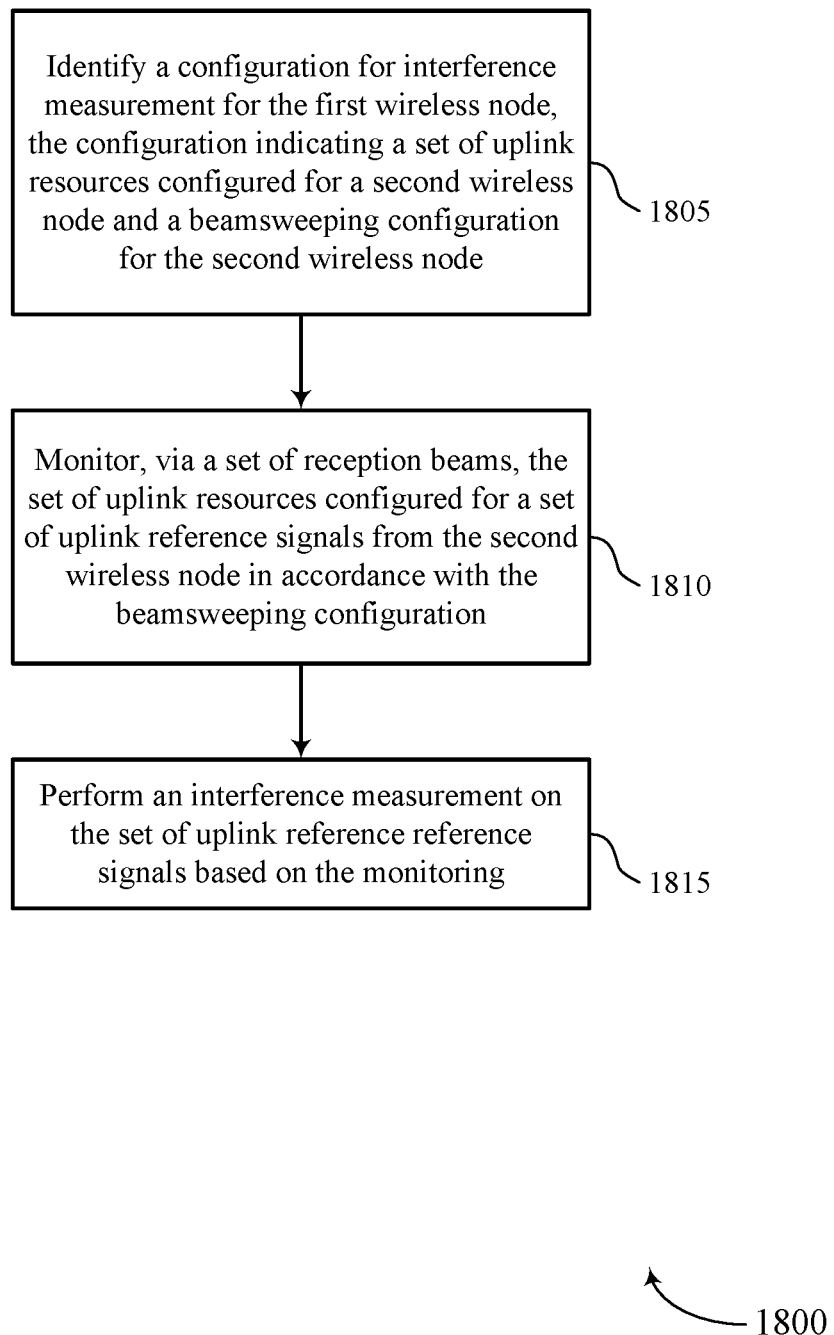

FIG. 18 shows a flowchart illustrating a method 1800 that supports interference measurement configurations in wireless systems in accordance with aspects of the present disclosure. The operations of method 1800 may be implemented by a UE 115 or base station 105 or its components as described herein. For example, the operations of method 1800 may be performed by a communications manager as described with reference to FIGS. 5 through 9. In some examples, a UE or base station may execute a set of instructions to control the functional elements of the UE or base station to perform the functions described herein. Additionally or alternatively, a UE or base station may perform aspects of the functions described herein using special-purpose hardware.

At 1805, the UE or base station may identify a configuration for interference measurement for the first wireless node, the configuration indicating a set of uplink resources configured for a second wireless node and a beam sweeping configuration for the second wireless node. The operations of 1805 may be performed according to the methods described herein. In some examples, aspects of the operations of 1805 may be performed by a configuration manager as described with reference to FIGS. 5 through 9.

At 1810, the UE or base station may monitor, via a set of reception beams, the set of uplink resources configured for a set of uplink reference signals from the second wireless node in accordance with the beam sweeping configuration. The operations of 1810 may be performed according to the methods described herein. In some examples, aspects of the operations of 1810 may be performed by a resource monitor as described with reference to FIGS. 5 through 9.

At 1815, the UE or base station may perform an interference measurement on the set of uplink reference signals based on the monitoring. The operations of 1815 may be performed according to the methods described herein. In some examples, aspects of the operations of 1815 may be performed by an interference manager as described with reference to FIGS. 5 through 9.

Figure 19:
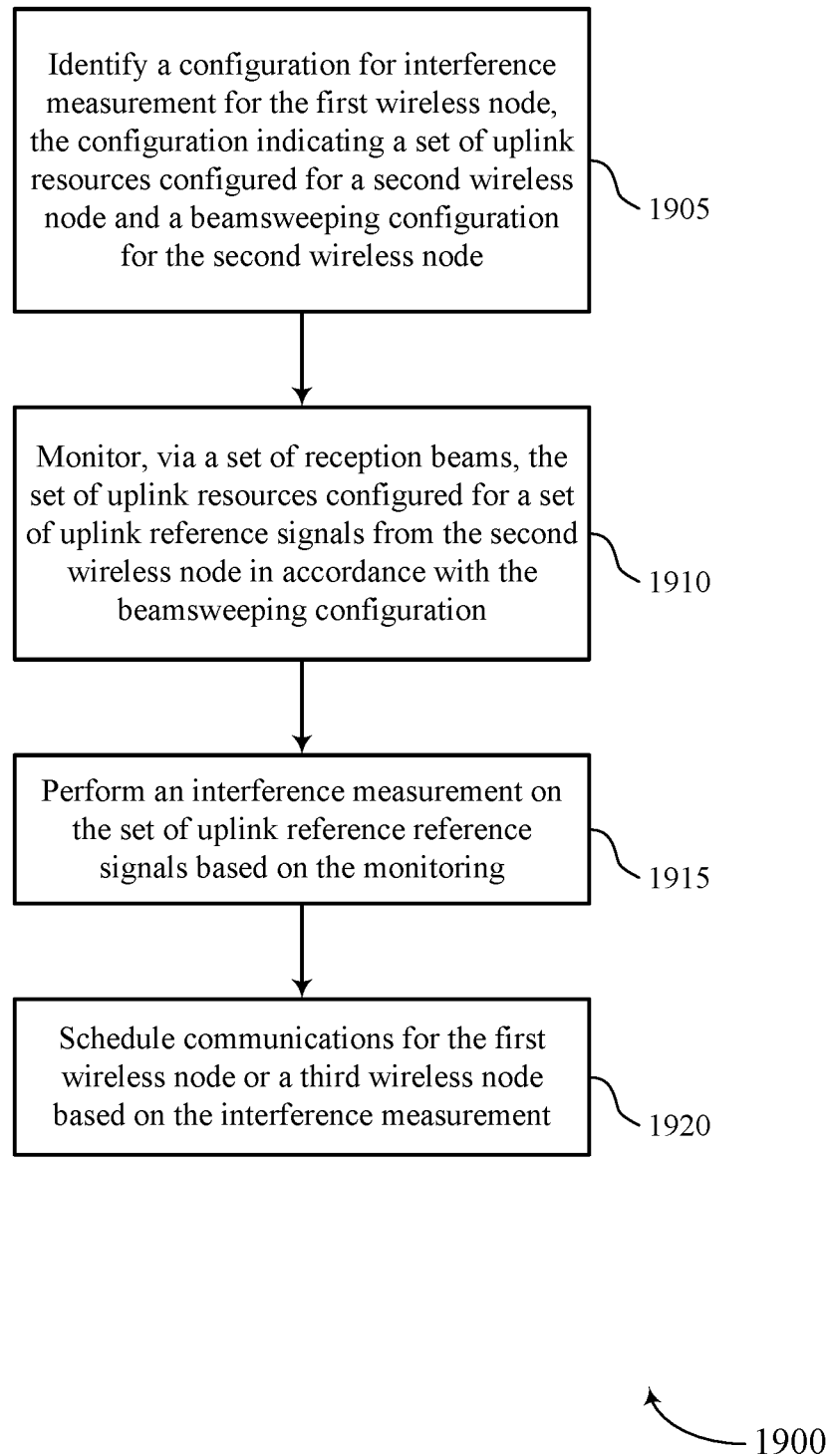

FIG. 19 shows a flowchart illustrating a method 1900 that supports interference measurement configurations in wireless systems in accordance with aspects of the present disclosure. The operations of method 1900 may be implemented by a UE 115 or base station 105 or its components as described herein. For example, the operations of method 1900 may be performed by a communications manager as described with reference to FIGS. 5 through 9. In some examples, a UE or base station may execute a set of instructions to control the functional elements of the UE or base station to perform the functions described herein. Additionally or alternatively, a UE or base station may perform aspects of the functions described herein using special-purpose hardware.

At 1905, the UE or base station may identify a configuration for interference measurement for the first wireless node, the configuration indicating a set of uplink resources configured for a second wireless node and a beam sweeping configuration for the second wireless node. The operations of 1905 may be performed according to the methods described herein. In some examples, aspects of the operations of 1905 may be performed by a configuration manager as described with reference to FIGS. 5 through 9.

At 1910, the UE or base station may monitor, via a set of reception beams, the set of uplink resources configured for a set of uplink reference signals from the second wireless node in accordance with the beam sweeping configuration. The operations of 1910 may be performed according to the methods described herein. In some examples, aspects of the operations of 1910 may be performed by a resource monitor as described with reference to FIGS. 5 through 9.

At 1915, the UE or base station may perform an interference measurement on the set of uplink reference signals based on the monitoring. The operations of 1915 may be performed according to the methods described herein. In some examples, aspects of the operations of 1915 may be performed by an interference manager as described with reference to FIGS. 5 through 9.

At 1920, the UE or base station may schedule communications for the first wireless node or a third wireless node based on the interference measurement. The operations of 1920 may be performed according to the methods described herein. In some examples, aspects of the operations of 1920 may be performed by a scheduler as described with reference to FIGS. 5 through 9.

Figure 20:
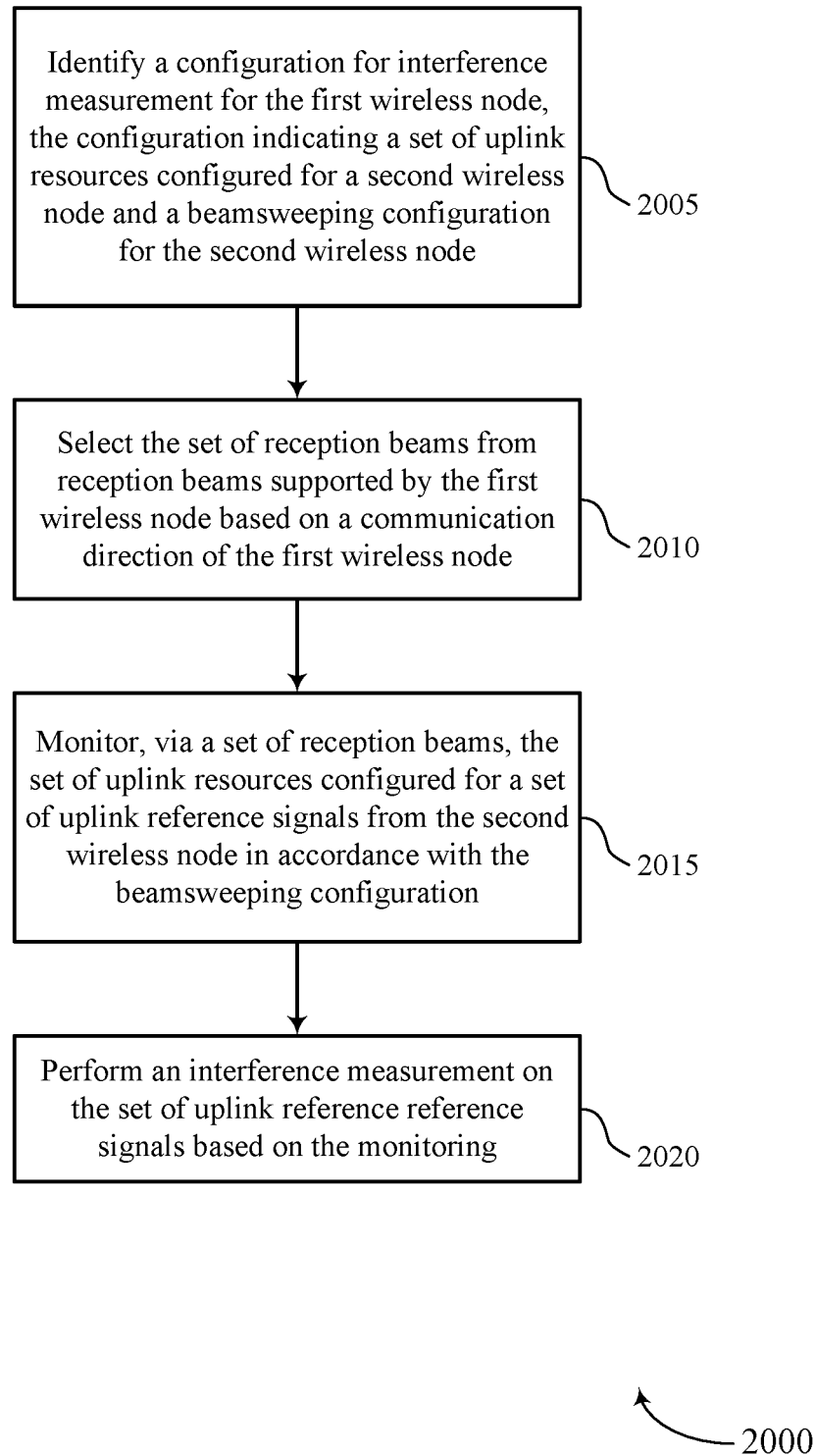

FIG. 20 shows a flowchart illustrating a method 2000 that supports interference measurement configurations in wireless systems in accordance with aspects of the present disclosure. The operations of method 2000 may be implemented by a UE 115 or base station 105 or its components as described herein. For example, the operations of method 2000 may be performed by a communications manager as described with reference to FIGS. 5 through 9. In some examples, a UE or base station may execute a set of instructions to control the functional elements of the UE or base station to perform the functions described herein. Additionally or alternatively, a UE or base station may perform aspects of the functions described herein using special-purpose hardware.

At 2005, the UE or base station may identify a configuration for interference measurement for the first wireless node, the configuration indicating a set of uplink resources configured for a second wireless node and a beam sweeping configuration for the second wireless node. The operations of 2005 may be performed according to the methods described herein. In some examples, aspects of the operations of 2005 may be performed by a configuration manager as described with reference to FIGS. 5 through 9.

At 2010, the UE or base station may select the set of reception beams from reception beams supported by the first wireless node based on a communication direction of the first wireless node. The operations of 2010 may be performed according to the methods described herein. In some examples, aspects of the operations of 2010 may be performed by a reception beam selector as described with reference to FIGS. 5 through 9.

At 2015, the UE or base station may monitor, via a set of reception beams, the set of uplink resources configured for a set of uplink reference signals from the second wireless node in accordance with the beam sweeping configuration. The operations of 2015 may be performed according to the methods described herein. In some examples, aspects of the operations of 2015 may be performed by a resource monitor as described with reference to FIGS. 5 through 9.

At 2020, the UE or base station may perform an interference measurement on the set of uplink reference signals based on the monitoring. The operations of 2020 may be performed according to the methods described herein. In some examples, aspects of the operations of 2020 may be performed by an interference manager as described with reference to FIGS. 5 through 9.

Figure 21:
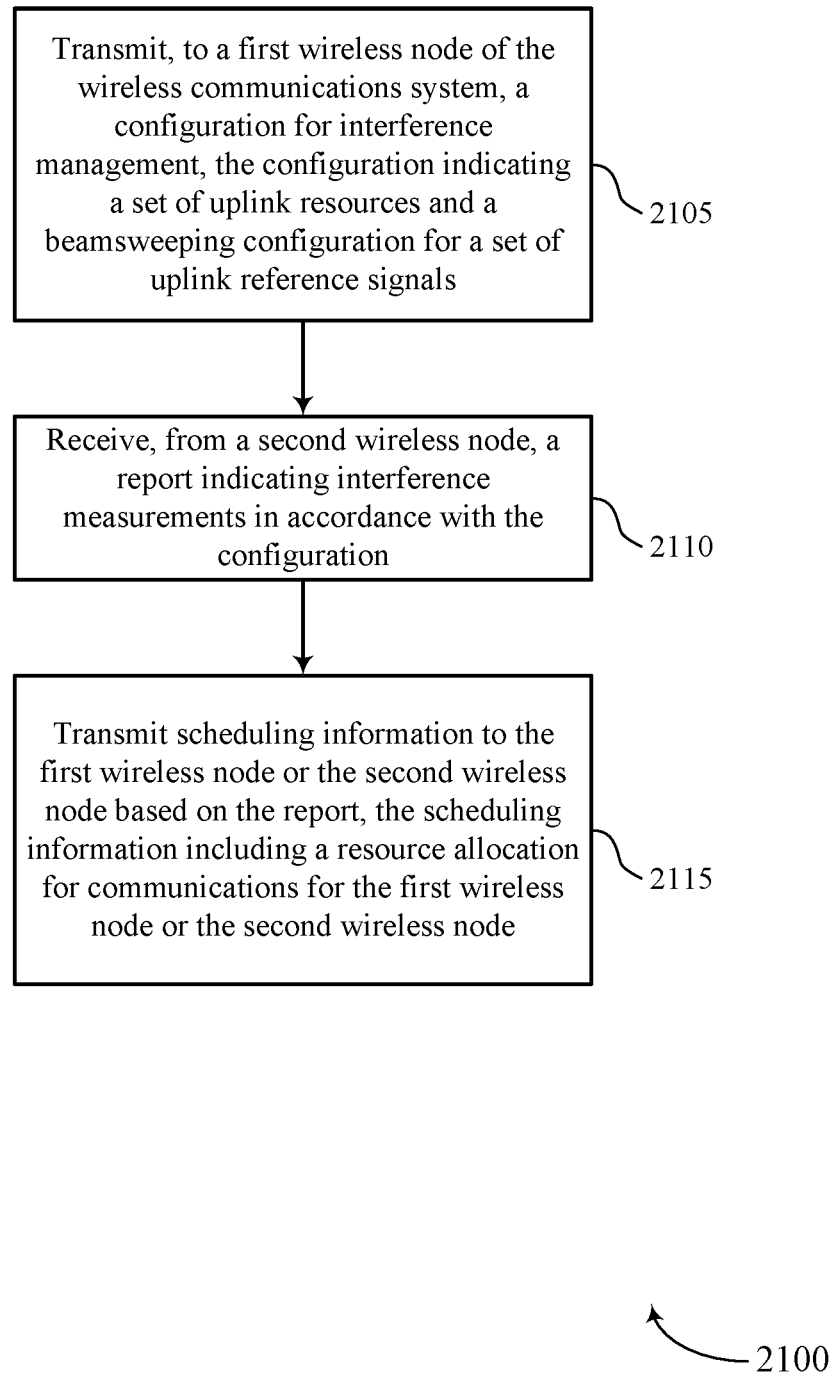

FIG. 21 shows a flowchart illustrating a method 2100 that supports interference measurement configurations in wireless systems in accordance with aspects of the present disclosure. The operations of method 2100 may be implemented by a base station 105 or its components as described herein. For example, the operations of method 2100 may be performed by a communications manager as described with reference to FIGS. 10 through 13. In some examples, a base station may execute a set of instructions to control the functional elements of the base station to perform the functions described herein. Additionally or alternatively, a base station may perform aspects of the functions described herein using special-purpose hardware.

At 2105, the base station may transmit, to a first wireless node of the wireless communications system, a configuration for interference management, the configuration indicating a set of uplink resources and a beam sweeping configuration for a set of uplink reference signals. The operations of 2105 may be performed according to the methods described herein. In some examples, aspects of the operations of 2105 may be performed by a configuration transmitter as described with reference to FIGS. 10 through 13.

At 2110, the base station may receive, from a second wireless node, a report indicating interference measurements in accordance with the configuration. The operations of 2110 may be performed according to the methods described herein. In some examples, aspects of the operations of 2110 may be performed by a report receiver as described with reference to FIGS. 10 through 13.

At 2115, the base station may transmit scheduling information to the first wireless node or the second wireless node based on the report, the scheduling information including a resource allocation for communications for the first wireless node or the second wireless node. The operations of 2115 may be performed according to the methods described herein.

In some examples, aspects of the operations of 2115 may be performed by a scheduling information transmitter as described with reference to FIGS. 10 through 13.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communications at a first wireless node in a wireless communications system, comprising: determining a configuration for interference measurement for the first wireless node, the configuration indicating a set of uplink resources for uplink reference signals used for interference measurements and a beam sweeping configuration for transmission of the uplink reference signals; determining a set of transmission beams for the uplink reference signals based at least in part on the beam sweeping configuration; and transmitting, to a second wireless node in the wireless communications system, the uplink reference signals via the set of uplink resources and the set of transmission beams in accordance with the beam sweeping configuration.

Aspect 2: The method of aspect 1, further comprising: receiving, from the second wireless node or another wireless node in the wireless communications system, an indication of the configuration for interference measurement.

Aspect 3: The method of aspect 2, wherein the configuration is received semi-statically or dynamically.

Aspect 4: The method of any of aspects 2 through 3, wherein the indication specifies an SRS configuration for interference measurement different from an SRS configuration for beam management.

Aspect 5: The method of any of aspects 1 through 4, further comprising: transmitting a report indicating that the first wireless node supports using an SRS configuration for interference measurement for the first wireless node.

Aspect 6: The method of aspect 5, wherein the report is transmitted semi-statically or dynamically.

Aspect 7: The method of any of aspects 1 through 6, wherein the configuration indicates one or more resource sets configured for interference measurement for the first wireless node, the one or more resource sets different from resource sets configured for beam management for the first wireless node.

Aspect 8: The method of any of aspects 1 through 7, further comprising: determining the set of transmission beams to be all transmission beams supported by the first wireless node; and transmitting the uplink reference signals via all the transmission beams supported by the first wireless node.

Aspect 9: The method of any of aspects 1 through 8, further comprising: identifying a codebook for interference measurement based at least in part on the beam sweeping configuration, wherein the codebook is different from codebooks for other communications by the first wireless node.

Aspect 10: The method of any of aspects 1 through 9, further comprising: determining a direction of communication for the first wireless node; determining the set of transmission beams based at least in part on the direction; and transmitting the uplink reference signals using the set of transmission beams in the direction of communication.

Aspect 11: The method of aspect 10, wherein the direction is associated with one or more parent nodes or one or more child nodes of the first wireless node.

Aspect 12: The method of any of aspects 10 through 11, wherein the direction is associated with one or more backhaul links of the first wireless node.

Aspect 13: The method of any of aspects 1 through 12, further comprising:
transmitting an indication of a number of transmission beams for beam sweeping via the set of uplink resources using the set of transmission beams.

Aspect 14: The method of aspect 13, further comprising: receiving, in response to the indication, the configuration for interference measurement, the configuration allocating resources for interference measurement based at least in part on the number of transmission beams.

Aspect 15: The method of any of aspects 13 through 14, wherein the indication is transmitted semi-statically or dynamically.

Aspect 16: The method of any of aspects 1 through 15, further comprising: receiving the configuration for interference measurement for the first wireless node, the configuration indicating a resource allocation for SRS resources, the resource allocation indicating one or more consecutive symbols within a slot for transmitting the uplink reference signals.

Aspect 17: The method of any of aspects 1 through 16, further comprising: receiving an uplink reference signal configuration for a third wireless node in the wireless communications system; monitoring for one or more uplink reference signals from the third wireless node based at least in part on the uplink reference signal configuration; and performing interference measurement of the third wireless node based at least in part on the one or more uplink reference signals.

Aspect 18: The method of aspect 17, wherein the uplink reference signal configuration for the third wireless node is received from the second wireless node or the third wireless node.

Aspect 19: The method of any of aspects 1 through 18, wherein the first wireless node and the second wireless node are in a parent-child relationship.

Aspect 20: A method for wireless communications at a first wireless node in a wireless communications system, comprising: identifying a configuration for interference measurement for the first wireless node, the configuration indicating a set of uplink resources configured for a second wireless node and a beam sweeping configuration for the second wireless node; monitoring, via a set of reception beams, the set of uplink resources configured for a set of uplink reference signals from the second wireless node in accordance with the beam sweeping configuration; and performing an interference measurement on the set of uplink reference signals based at least in part on the monitoring.

Aspect 21: The method of aspect 20, further comprising: scheduling communications for the first wireless node or a third wireless node based at least in part on the interference measurement.

Aspect 22: The method of any of aspects 20 through 21, wherein identifying the configuration for interference measurement comprises: receiving, from a central unit, an indication of the configuration for interference measurement for the first wireless node.

Aspect 23: The method of any of aspects 20 through 22, further comprising:
selecting the set of reception beams from reception beams supported by the first wireless node based at least in part on a communication direction of the first wireless node.

Aspect 24: The method of aspect 23, wherein the communication direction corresponds to a parent node or a child node of the first wireless node, or one or more backhaul links associated with the first wireless node.

Aspect 25: The method of any of aspects 20 through 24, further comprising: transmitting, to at least one of the second wireless node or a central unit, a report indicating a result of the interference measurement.

Aspect 26: The method of any of aspects 20 through 25, wherein the configuration indicates a transmission power associated with the set of uplink reference signals; and the set of uplink reference signals comprises one or more sounding reference signals (SRSs).

Aspect 27: A method for wireless communications at a central unit of a wireless communications system, comprising: transmitting, to a first wireless node of the wireless communications system, a configuration for interference management, the configuration indicating a set of uplink resources and a beam sweeping configuration for a set of uplink reference signals; receiving, from a second wireless node, a report indicating interference measurements in accordance with the configuration; and transmitting scheduling information to the first wireless node or the second wireless node based at least in part on the report, the scheduling information comprising a resource allocation for communications for the first wireless node or the second wireless node.

Aspect 28: The method of aspect 27, wherein the configuration indicates a set of reception beams for the second wireless node to be used for the interference measurements.

Aspect 29: The method of any of aspects 27 through 28, wherein the first wireless node is a child or a grandchild of the central unit.

Aspect 30: An apparatus for wireless communications at a first wireless node in a wireless communications system, comprising a processor; memory coupled with the processor; and instructions stored in the memory and executable by the processor to cause the apparatus to perform a method of any of aspects 1 through 19.

Aspect 31: An apparatus for wireless communications at a first wireless node in a wireless communications system, comprising at least one means for performing a method of any of aspects 1 through 19.

Aspect 32: A non-transitory computer-readable medium storing code for wireless communications at a first wireless node in a wireless communications system, the code comprising instructions executable by a processor to perform a method of any of aspects 1 through 19.

Aspect 33: An apparatus for wireless communications at a first wireless node in a wireless communications system, comprising a processor; memory coupled with the processor; and instructions stored in the memory and executable by the processor to cause the apparatus to perform a method of any of aspects 20 through 26.

Aspect 34: An apparatus for wireless communications at a first wireless node in a wireless communications system, comprising at least one means for performing a method of any of aspects 20 through 26.

Aspect 35: A non-transitory computer-readable medium storing code for wireless communications at a first wireless node in a wireless communications system, the code comprising instructions executable by a processor to perform a method of any of aspects 20 through 26.

Aspect 36: An apparatus for wireless communications at a central unit of a wireless communications system, comprising a processor; memory coupled with the processor; and instructions stored in the memory and executable by the processor to cause the apparatus to perform a method of any of aspects 27 through 29.

Aspect 37: An apparatus for wireless communications at a central unit of a wireless communications system, comprising at least one means for performing a method of any of aspects 27 through 29.

Aspect 38: A non-transitory computer-readable medium storing code for wireless communications at a central unit of a wireless communications system, the code comprising instructions executable by a processor to perform a method of any of aspects 27 through 29.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for communications at a first wireless node in an integrated access backhaul system, comprising:
transmitting, from a mobile terminal of the first wireless node and via a first backhaul link, a report indicating that the first wireless node supports using sounding reference signals (SRSs) for interference measurement;
receiving, at the mobile terminal of the first wireless node and after transmission of the report, an indication of a configuration for interference measurement based at least in part on the report, the configuration indicating one or more SRS resource sets for interference measurement and a beam sweeping configuration for transmission of the SRSs, wherein the one or more SRS resource sets configured for interference measurement are different from one or more SRS resource sets configured for beam management; and
transmitting, from the mobile terminal of the first wireless node and to a second wireless node in the integrated access backhaul system via a second backhaul link, the SRSs via the one or more SRS resource sets and using a set of transmission beams selected by the mobile terminal of the first wireless node based at least in part on the beam sweeping configuration.

2. The method of claim 1, further comprising:
receiving, from the second wireless node or another wireless node in the integrated access backhaul system, the indication of the configuration for interference measurement.

3. The method of claim 2, wherein the configuration is received semi-statically or dynamically.

4. The method of claim 1, wherein the report is transmitted semi-statically or dynamically.

5. The method of claim 1, further comprising:
determining the set of transmission beams to be all transmission beams supported by the first wireless node; and
transmitting the SRSs via all the transmission beams supported by the first wireless node.

6. The method of claim 1, further comprising:
identifying a codebook for the interference measurement based at least in part on the beam sweeping configuration, wherein the codebook is different from codebooks for other communications by the first wireless node.

7. The method of claim 1, further comprising:
determining a direction of communication for the first wireless node;
determining the set of transmission beams based at least in part on the direction; and
transmitting the SRSs using the set of transmission beams in the direction of communication.

8. The method of claim 7, wherein the direction is associated with one or more parent nodes or one or more child nodes of the first wireless node in the integrated access backhaul system.

9. The method of claim 7, wherein the direction is associated with one or more backhaul links of the first wireless node.

10. The method of claim 1, further comprising:
transmitting an indication of a number of transmission beams for beam sweeping via the SRSs using the set of transmission beams.

11. The method of claim 10, further comprising:
receiving, in response to the indication, the configuration for interference measurement, the configuration allocating resources for the interference measurement based at least in part on the number of transmission beams.

12. The method of claim 10, wherein the indication is transmitted semi-statically or dynamically.

13. The method of claim 1, further comprising:
receiving the configuration for interference measurement for the first wireless node, the configuration indicating a resource allocation for SRS resources, the resource allocation indicating one or more consecutive symbols within a slot for transmitting SRSs.

14. The method of claim 1, further comprising:
receiving an SRS configuration for a third wireless node in the integrated access backhaul system;
monitoring for one or more SRSs from the third wireless node based at least in part on the SRS configuration; and
performing interference measurement of the third wireless node based at least in part on the one or more SRSs.

15. The method of claim 14, wherein the SRS configuration for the third wireless node is received from the second wireless node or the third wireless node.

16. The method of claim 1, wherein the first wireless node and the second wireless node are in a parent-child relationship in the integrated access backhaul system.

17. A method for communications at a first wireless node in an integrated access backhaul system, comprising:
transmitting, from a mobile terminal of the first wireless node and via a first backhaul link, a report indicating that the first wireless node supports using sounding reference signals (SRSs) for interference measurement;
receiving, at the mobile terminal of the first wireless node and after transmission of the report, an indication of a configuration for interference measurement based at least in part on the report, the configuration indicating one or more SRS resource sets configured for interference measurement and a beam sweeping configuration for the SRSs, wherein the one or more SRS resource sets configured for interference measurement are different from one or more SRS resource sets configured for beam management;
monitoring, via a set of reception beams associated with a distributed unit of the first wireless node, the one or more SRS resource sets for the SRSs from a second wireless node in accordance with the beam sweeping configuration; and
performing, at the distributed unit associated with the first wireless node, the interference measurement on the SRSs based at least in part on the monitoring.

18. The method of claim 17, further comprising:
scheduling communications for the first wireless node or a third wireless node based at least in part on the interference measurement.

19. The method of claim 17, wherein identifying the configuration for interference measurement comprises:
receiving, from a central unit, the indication of the configuration for interference measurement for the first wireless node.

20. The method of claim 17, further comprising:
selecting the set of reception beams from reception beams supported by the first wireless node based at least in part on a communication direction of the first wireless node.

21. The method of claim 20, wherein the communication direction corresponds to a parent node or a child node of the first wireless node, or one or more backhaul links associated with the first wireless node.

22. The method of claim 17, further comprising:
transmitting, to at least one of the second wireless node or a central unit, a report indicating a result of the interference measurement.

23. The method of claim 17, wherein:
the configuration indicates a transmission power associated with SRSs.

24. A method for communications at a central unit of an integrated access backhaul system, comprising:
receiving, via a first backhaul link, a first report indicating that a first wireless node, a second wireless node, or both support using a sounding reference signals (SRSs) for interference measurement;
transmitting, via the first backhaul link and to a mobile terminal associated with the first wireless node of the integrated access backhaul system and after receiving the first report, a configuration for interference management based at least in part on the report, the configuration indicating one or more SRS resource sets for interference measurement and a beam sweeping configuration for the SRSs, wherein the one or more SRS resource sets configured for interference measurement are different from one or more SRS resource sets configured for beam management;
receiving, via a second backhaul link and from a distributed unit associated with the second wireless node, a second report indicating interference measurements in accordance with the configuration; and
transmitting, via the first backhaul link or the second backhaul link, scheduling information to the first wireless node or the second wireless node based at least in part on the second report, the scheduling information comprising a resource allocation for communications for the first wireless node or the second wireless node.

25. The method of claim 24, wherein the configuration indicates a set of reception beams for the second wireless node to be used for the interference measurements.

26. The method of claim 24, wherein the first wireless node is a child or a grandchild of the central unit.

27. An apparatus for wireless communications at a first wireless node in an integrated access backhaul system, comprising:
a processor,
memory coupled with the processor; and
instructions stored in the memory and executable by the processor to cause the apparatus to:
transmit, from a mobile terminal of the first wireless node and via a first backhaul link, a report indicating that the first wireless node supports using sounding reference signals (SRSs) for interference measurement;
receive, at the mobile terminal of the first wireless node and after transmission of the report, an indication of a configuration for interference measurement based at least in part on the report, the configuration indicating one or more SRS resource sets for interference measurement and a beam sweeping configuration for transmission of the SRSs, wherein the one or more SRS resource sets configured for interference measurement are different from one or more SRS resource sets configured for beam management; and
transmit, from the mobile terminal of the first wireless node and to a second wireless node in the integrated access backhaul system via a second backhaul link, the SRSs via the one or more SRS resource sets and using a set of transmission beams selected by the mobile terminal of the first wireless node based at least in part on the beam sweeping configuration.

\* \* \* \* \*